United States Patent
Sierra et al.

(10) Patent No.: US 7,548,610 B2
(45) Date of Patent: Jun. 16, 2009

(54) VOICE-ACTIVATED GEOGRAPHICALLY BASED TELEPHONE ROUTING SYSTEM AND METHOD

(75) Inventors: Juan F. Sierra, Longwood, FL (US); Daniel E. Neville, Lake Mary, FL (US)

(73) Assignee: Alaven, Inc., Longwood, FL (US)

( * ) Notice: Subject to any disclaimer, the term of this patent is extended or adjusted under 35 U.S.C. 154(b) by 39 days.

(21) Appl. No.: 10/366,223

(22) Filed: Feb. 14, 2003

(65) Prior Publication Data

US 2003/0179862 A1 Sep. 25, 2003

Related U.S. Application Data

(63) Continuation of application No. 09/059,857, filed on Apr. 14, 1998, now abandoned.

(51) Int. Cl.
*H04M 1/64* (2006.01)
(52) U.S. Cl. .............. 379/88.01; 455/404.2; 455/456.2; 455/456.3; 455/457
(58) Field of Classification Search ............ 379/88.16, 379/88.18, 88.19, 88.2, 88.21, 127.01, 201.01, 379/201.06, 207.15, 219, 220.01, 221.14, 379/142.1, 88.01; 455/456.1–456.3, 456.2, 455/414.2, 414.3, 404.2, 457
See application file for complete search history.

(56) References Cited

U.S. PATENT DOCUMENTS

| | | | | |
|---|---|---|---|---|
| 4,757,267 | A | 7/1988 | Riskin | 379/114.24 |
| 5,136,633 | A | 8/1992 | Tejada et al. | 379/91.02 |
| 5,157,390 | A | 10/1992 | Yoshie et al. | 340/825.32 |
| 5,247,571 | A | 9/1993 | Kay et al. | 379/221.09 |
| 5,317,627 | A * | 5/1994 | Richardson et al. | 379/88.17 |

(Continued)

*Primary Examiner*—Simon Sing
(74) *Attorney, Agent, or Firm*—Allen, Dyer, Doppelt, Milbrath & Gilchrist, P.A.

(57) ABSTRACT

A method and system for determining, through voice recognition, the geographic location of the initiator of a telephone call. The initiator dials a specified telephone number and is connected to a computer system. The telephone number dialed is used in a system that requires knowledge of the initiator's location to determine the recipient of the call. The system asks the initiator one of a series of questions, those questions designed by the user of the system (client) to determine which one of a plurality of recipients should receive the call. The initiator's verbal response to each question is digitized using speech recognition technology. The system uses each digitized response to either assign a location designator to the call or ask more definitive questions. At the point where the answers have satisfied the client's location determination, the point of call origination is determined and a locational designator is assigned to the initiator. The locational designator generated by the system can be correlated to a number of geographic designations, such as postal indicators (e.g., zip code, zip +4, postal code), major and minor civil divisions, latitude and longitude, geographic boundaries, political boundaries or client-defined geography such as service areas, sales territories, or delivery territories. The locational designator of the initiator is used in place of the ANI in location-based call routing systems. As a result of such correlation, this invention is particularly useful for cellular telephones, non stationary communications devices, emergency services, dealer locator systems, and delivery services, or any application where the initiator is connected to one of a plurality of recipients based on matching the initiator's location to client-defined criteria, including wherein a recipient's number is a local telephone number. The locational designator may be defined by a point, a line, a geographic area, an intersection, or by client-defined criteria.

24 Claims, 21 Drawing Sheets

U.S. PATENT DOCUMENTS

| | | | |
|---|---|---|---|
| 5,432,841 A * | 7/1995 | Rimer | 455/457 |
| 5,465,295 A | 11/1995 | Furman | 379/221.14 |
| 5,502,761 A * | 3/1996 | Duncan et al. | 379/142.01 |
| 5,506,897 A | 4/1996 | Moore et al. | 379/220.01 |
| 5,559,520 A | 9/1996 | Barzegar et al. | 342/357.1 |
| 5,588,048 A | 12/1996 | Neville | 379/127.01 |
| 5,839,088 A | 11/1998 | Hancock et al. | 701/213 |
| 5,848,131 A * | 12/1998 | Shaffer et al. | 379/88.2 |
| RE36,111 E | 2/1999 | Neville | 379/127.01 |
| 5,878,126 A | 3/1999 | Velamuri et al. | 379/219 |
| 5,883,580 A | 3/1999 | Briancon et al. | 340/7.52 |
| 5,901,214 A | 5/1999 | Shaffer et al. | 379/211.02 |
| 5,959,580 A | 9/1999 | Maloney | 342/457 |
| 5,963,861 A | 10/1999 | Hanson | 455/456.1 |
| 6,009,149 A | 12/1999 | Langsenkamp | 379/69 |
| 6,029,069 A | 2/2000 | Takaki | 455/456.1 |
| 6,058,179 A | 5/2000 | Shaffer et al. | 379/220.01 |
| 6,119,013 A | 9/2000 | Maloney | 455/456.2 |
| 6,163,597 A * | 12/2000 | Voit | 379/220.01 |
| 6,259,405 B1 | 7/2001 | Stewart et al. | 342/457 |
| 6,263,280 B1 | 7/2001 | Stingone | 701/213 |
| 6,301,480 B1 * | 10/2001 | Kennedy et al. | 455/445 |
| 6,381,324 B1 | 4/2002 | Shaffer et al. | 379/211.02 |
| 6,385,312 B1 | 5/2002 | Shaffer et al. | 379/211.02 |
| 6,393,403 B1 | 5/2002 | Majaniemi | 704/275 |
| 6,411,893 B2 | 6/2002 | Ruhl | 701/207 |
| 6,477,363 B1 | 11/2002 | Ayoub et al. | 455/404.2 |
| 6,487,290 B1 | 11/2002 | Le Grand | 379/265.02 |
| 6,501,966 B1 | 12/2002 | Bareis et al. | 455/563 |
| 6,515,623 B2 | 2/2003 | Johnson | 342/387 |
| 6,522,889 B1 | 2/2003 | Aarnio | 455/456.5 |
| 6,721,395 B2 * | 4/2004 | Martinez | 379/201.01 |
| 6,816,727 B2 * | 11/2004 | Cox et al. | 455/414.1 |
| 6,853,849 B1 * | 2/2005 | Tognazzini | 455/457 |
| 6,952,181 B2 * | 10/2005 | Karr et al. | 342/457 |
| 2003/0050075 A1 * | 3/2003 | Rangarajan et al. | 455/456 |

* cited by examiner

VOICE-ACTIVATED GEOGRAPHICALLY BASED TELEPHONE ROUTING SYSTEM AND METHOD

CROSS-REFERENCE TO RELATED APPLICATION

This is a continuation of application Ser. No. 09/059,857, filed Apr. 14, 1998, now abandoned.

BACKGROUND OF THE INVENTION

This invention relates to systems for locating the geographic origination of the initiator of a telephone call and more particularly to one that uses voice recognition to determine the locational designator of the caller without the need to correlate the initiator's telephone number to other databases.

In the field of telephone call processing, current art provides a process that allows a client (user of the invention) to use a single telephone number to connect initiators who dial that telephone number to one of a plurality of recipients. The selection of recipient is based on the geographic origination of the call and client-defined criteria. Some examples of location based routing with pluralities of recipients include "800"-type numbers (for example 800, 888, 877, 866, and 900 applications, among others), applications where the recipient pays for the call, dealer locator systems, local routing based on a published local number, and emergency numbers, such as "911" in the U.S. These are but a few examples of location-based routing.

The initiator's telephone number is identified using Automatic Number Identification (ANI). The ANI is often correlated to a unique geographic reference, such as Vertical/Horizontal (VH) coordinates, latitude/longitude (lat/lon), ZIP+4, or a locational designator for example. A predefined method is used, such as an on-line computation or a database lookup, to match the ANI and/or its locational designator to one of a plurality of a client's recipients corresponding to one of a plurality of territorial designators, and the call is sent to the appropriate recipient telephone number.

ANI-based systems, such as the one described above, work correctly when the call is placed from a fixed location telephone, and the ANI that is forwarded matches the initiator's telephone number. Local telephone companies operating in areas without equal-access do not provide ANI; as a result the ANI is often 0000000000, as compared with a normal ANI of 4076823022. Local phone companies have begun offering to their customers "ANI blockage" or "no ANI forwarded" packages. Calls placed from cellular phones present another set of problems in terms of locating the point of origin of the call.

When using a cellular telephone, the ANI reported is often not the ANI of the cellular phone, but that of a standard land line where the cellular phone connects. This connection point is called a trunk line. The phone number that is reported is called the pseudo-ANI. The particular cellular company to which the caller subscribes assigns a pseudo-ANI to this trunk line. The trunk line's pseudo-ANI is then used for call processing, instead of the telephone number of the cellular phone. When calling from a given cellular phone, the pseudo-ANI that forwarded is the same for any cellular telephone caller for the trunk line, regardless of the physical location of the caller.

Another problem arises in trying to determine the geographic location from where a cellular caller initiates. If an initiator dials an 800 number from home using a standard telephone, the initiator's locational designator will always be the same. With a cellular phone, however, if an initiator were to place two calls 5 minutes apart while driving on an interstate, for example, it is highly possible that the second call would have a locational designator 4-6 miles away from the locational designator of the first call. A third call could give yet a different locational designator.

An additional problem exists when people place calls from cellular phones to 800 numbers. The recipient of the call, who also pays for the call, does not receive an accurate ANI that can be used to identify who made the call. Often, there is not a way to get back in touch with a caller. As the use of cellular phones increases, the impact of 'unknown' calls from cellular phones can be significant to a business relying on 800 type numbers.

The lack of an effective system for locating cellular-telephone callers is a grave concern, particularly in emergency situations, criminal acts on people, and any situation where a person does not know where he or she is located. This is also a problem in systems such as dealer locator systems, where the location of the caller must be known before the call can connect to the final destination.

Therefore, in view of the above, a need exists to find a different method to determine the exact location of a call initiator. This method is based on using the initiator's verbal response to a series of computer-generated questions, digitizing the answers to those questions using voice recognition technology, and using those answers to further process the call. It is important to remember that there is a difference between Voice Response Units, which are typically used to speak back information to the caller, and Voice Recognition, which digitizes the caller's vocal input and uses that digitized input to perform additional processing.

DESCRIPTION OF PRIOR ART

The known prior art includes many U.S. patents, but none employs voice recognition in a system and method for routing telephone calls like the present invention. For instance, U.S. Pat. No. 5,588,048, issued to Neville on Dec. 24, 1996 (reissued on Feb. 23, 1999 as RE36,111) teaches a system wherein a latitude and longitude can be assigned to an ANI for use in routing calls from ANIs in geographical territories to preselected locations. U.S. Pat. No. 4,757,267, issued to Riskin on Jul. 12, 1988, teaches a geocoding system that uses a "logic tree" concept and vertical-horizontal coordinates for locational purposes, but it does not use voice recognition and thus would not be useable with cellular telephones as in the present invention. U.S. Pat. No. 5,136,633, issued to Tejada, et al. on Aug. 4, 1992, teaches a merchant and card authorization system which uses voice request. U.S. Pat. No. 5,247,571, issued to Kay, et al. on Sep. 21, 1993, teaches an area wide Centrex system for connecting members of a group. U.S. Pat. No. 5,157,390, issued to Yoshie, et al. on Oct. 20, 1992, teaches a method of providing a network service through a series of modules. U.S. Pat. No. 5,465,295 issued to Furman on Nov. 7, 1995, covers a voice mail system. U.S. Pat. No. 5,506,897, issued to Moore, et al. on Apr. 9, 1996, employs location determining means, but does not use voice recognition. U.S. Pat. No. 5,559,520 issued to Barzegar, et al. on Sep. 24, 1996, involves a wireless system for obtaining location information which utilizes GPS and cellular communication in determining location of mobile vehicles, but it does not employ voice recognition. U.S. Pat. No. 6,009,149 issued to Langsenkamp on Dec. 28, 1999 provides a means for a callee to provide the callee's location to the system, but does not provide a means for caller communication of location information. Furthermore, Langsenkamp's teachings all deal with outbound call processing. U.S. Pat. No. 6,029,069 issued to Takaki on Feb. 22, 2000 teaches how to locate a caller when the caller can locate visual reference point, but does not teach a means of locating a caller on a highway between cities or connecting a caller to one of a plurality of locations based on the caller's location. U.S. Pat. No. 6,119,013 issued to Maloney on Sep. 12, 2000 teaches a means for locating a caller measuring the signals between the cell phone and the recipient cellular towers, but likewise does not teach routing the call to one of a plurality of locations based on that information. U.S. Pat. No. 5,959,580 issued to Maloney on Sep. 28, 1999 teaches how to locate callers using voice processing but does not teach using the location information to route the call to one of a plurality of destinations based on the location information. U.S. Pat. No. 5,901,214 issued to Shaffer et al on May 4, 1999 teaches the use of a 10-digit phone number and a Voice Response Unit but does not teach about non-ANI applications, nor does it teach processing of voice data beyond simple prompts, nor does it teach a method to process the data if a spatial key cannot be determined.

SUMMARY OF THE INVENTION

The primary object of the present invention is to provide a method for determining the geographic origination by locational designator of the initiator of a telephone call, especially one using a cellular, or non-stationary, or mobile telephone or communication device, for use in a system that requires knowledge of the initiator's location to determine the recipient of the call from a plurality of possible recipients, including wherein a recipient's number is a local telephone number.

Another object of the present invention is to provide such a system wherein the locational designator of the initiator can be collated to other desired territorial designators or client-defined geographical territories.

The invention described and disclosed herein comprises a method and system to determine the locational designator of the initiator of a telephone call, using verbal responses to computer generated questions. The sequence of questions is determined by a company who desires to use the system to rout telephone calls from a common number to one of a plurality of company dealers, the company hereafter referred to as the client. The questions can be assembled using predefined modules, functions or procedures, or by using client-defined criteria to tailor the questioning to the specific need of the client. As presented herein, the modules, functions or procedures are representative and not indicative of the scope of all possible module, functions or procedures. The questions are designed to ultimately elicit a response from the initiator providing the most-specific locational designator necessary for the client's application. The responses to these questions are digitized and matched against a set of possible answers. The response represents an answer set, and can contain-one or several entries. Once the answer set contains only enough information to determine the locational designator, the locational designator of that entry is used for further processing. If the answer set contains multiple entries, another decision tree with more questions is accessed. Each subsequent decision tree contains questions, the answers to which reduce the number of entries in the answer set to eliminate all but the information necessary to determine a locational designator. At whatever point along the decision tree the answer set satisfies client criteria, a locational designator is determined. Once the locational designator has been determined, client-defined criteria is used to determine which one of a plurality of client locations should receive the call.

There may be instances where client-defined criteria may dictate that the caller ultimately choose a recipient from a plurality of selected recipients.

The above and other objects, features and advantages of the present invention should become even more readily apparent to those skilled in the art upon a reading of the following detailed description in conjunction with the drawings wherein there is shown and described illustrative embodiments of the invention.

BRIEF DESCRIPTION OF THE DRAWINGS

In the following detailed description, reference will be made to the attached drawings in which.

DESCRIPTION OF THE PREFERRED EMBODIMENTS

Figure 1:
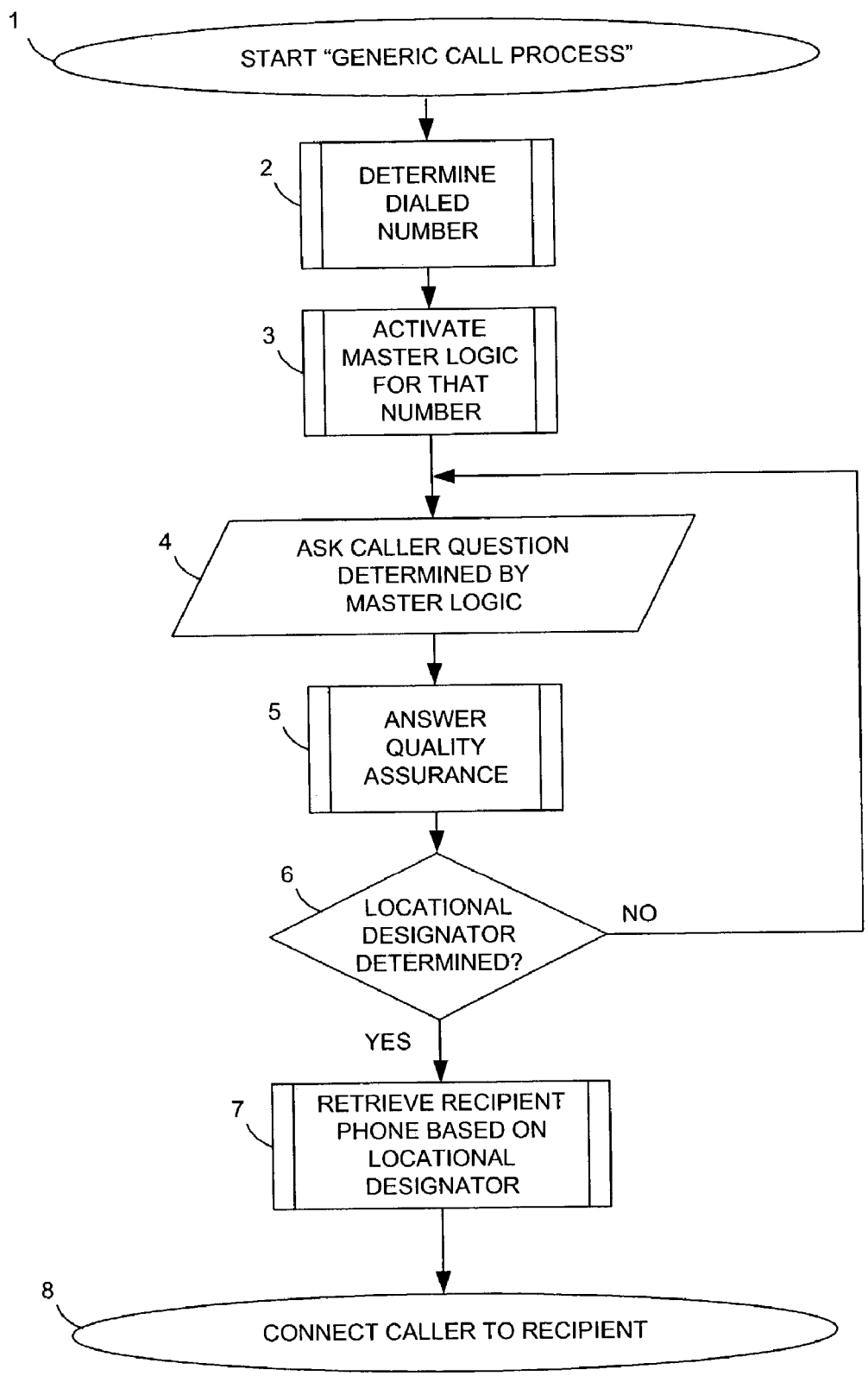
FIG. 1 is a flow diagram of the representative "generic call process" which illustrates the basis for most embodiments.

This invention can be customized based on the need of the client. In many applications, it will be desirable to locate the caller by address. As an alternate configuration, a client may wish to locate a caller by postal areas (such as ZIP or postal codes), governmental geography (city, county, etc.) or within a customized area designed by the client (such as a delivery zone or a sales territory).

While it is obvious that there are many ways to configure the system, this description of the preferred embodiment will assume that the client wishes to configure the system for location by address.

In an alternative embodiment, the client may wish to configure the system to determine the locational designator when the call is placed from a node on a physical network, and the call is connected to a telephone without having originated from a telephone. The call is placed from someone at a computer responding to a "talk to a dealer now" or similar prompt on a web site. The dealer is selected from one of a plurality of dealers based on proximity of the dealer to the caller or other client-defined criteria. The call is placed and ultimately routed using Voice over IP (VoIP) technology, which results in a non-ANI telephone call. An alternative to ANI must be provided to complete the call, and the caller begins a question-and-response session to determine the caller's location. Alternatives are available, including IP address tracing utilities. In any case, the IP address is correlated to an address to obtain the locational designator.

In an alternative embodiment, the client may wish to configure the system to determine the locational designator when the call is placed from a node on a wireless network, and the call is connected to a telephone without having originated from a land-line telephone. Wireless telephones, such as cellular phones, PCS phones and Nextel's Direct Connect™ walkie-talkie are but a few of the examples applicable to this embodiment. None of these devices provide an ANI that is immediately correlatable to a caller's location. In many instances, the logic module for this type of application may be address logic control, but it is certain that alternatives may be deployed dependent on client-defined criteria.

In another alternative embodiment, the client may wish to configure the system to determine the locational designator when the call is placed from a modem. Modems do not typically send ANI, and when used in conjunction with a portable computer, do not provide point-of-origin information. An alternative means must be described to locate the caller using a modem.

In yet another alternative embodiment, the client may wish to configure the system to determine the locational designator when the call is placed from a wireless device other than a cell phone, such as a cellular modem attached to either a portable computer or a Personal Digital Assistant. These wireless devices do not forward ANI, so alternatives must be presented to locate callers using these devices.

In yet another alternative embodiment the client may wish to configure a system to accommodate callers using GeoPositioning Satellite (GPS) devices or other such location-determining devices. In the case where the caller has access to latitude and longitude numbers using a GPS or other device, the caller speaks the latitude and longitude values back to the system. The latitude and longitude coordinates are the locational designator. As is the case in all embodiments, the appropriate destination is determined based on the locational designator and client-defined criteria. One example of an embodiment of this application would be providing GPS devices to individuals in a remote area such as a national park or a national forest, with the latitude and longitude values used to determine which aid station of a plurality of aid stations should assist the caller.

In yet another alternative embodiment, the invention can be used in an application such as road-side services offered by a motor club. Calls to a motor club typically go to a large call center and are handled by a trained operator. Due to their nature of handling calls from mobile customers, a large number of their calls are made from non-stationary phones, such as cellular phones, and require special handling to locate the caller. These calls take substantially longer to handle than normal calls, with most of the extra time being spent trying to define the caller's location. By altering the call flow to include this invention in cases where there is no ANI or the call has been identified as originating from a non-stationary phone, the client can isolate the non-stationary call from the operator until the caller's locational designator has been identified. In this manner, the highly trained operator spends less time trying to determine the appropriate service provider assigned to provide service to the area in which the caller's locational designator is located and more time dispatching service providers. By implementing this invention in the call flow to allow background and automated processing of calls from non-stationary phones, motor clubs and other providers of emergency services can get assistance to their callers in a more timely manner. The system used by the client can now have caller location information available, whether the call originates from a stationary or non-stationary phone.

Yet another alternate embodiment would be one in which the client uses a single telephone number to route a cellular call to one of a plurality of specialty retailers, the retailers located on limited access highways. An example might be a diesel fuel retailer who accepts a certain type of credit card. Client-defined criteria would most likely employ some variant of the "limited access" processing module, as well as the client-defined help module. After determining an initiator's location and assigning a locational designator to the initiator, the caller is routed to the appropriate retailer out of a plurality of said retailers based on the callers location on a limited access highway, and the relation of locational designator to client-defined criteria.

Refer now to FIG. 1, which is a drawing of the generic call process 1 which most embodiments should follow. The steps represented herein are indicative of the types of procedures and information flow required to process a call in most cases. First, it is necessary to DETERMINE THE DIALED NUMBER 2. There are many ways to accomplish this; among them are DNIS (Dialed Number Identification Service), informational digits (infodigits) included with the call setup, wireless call setup information, internet script actions and so forth. Once the dialed number has been received and determined, the system ACTIVATES THE MASTER LOGIC CONTROL FOR THAT NUMBER 3. The master logic control is opened at the beginning of every call and closed at the end of every call, meaning that there is an instance of the master logic control for each call. After the master logic control has been activated, the system ASKS THE CALLER A QUESTION DETERMINED BY THE MASTER LOGIC 4. The next step in the process should be ANSWER QUALITY ASSURANCE 5 where the answer is validated for accuracy. Next, the system checks for the condition HAS THE LOCATIONAL DESIGNATOR BEEN DETERMINED 6? If it has not been determined, the process loops back through ASK CALLER QUESTION 4 for further processing. This check allows the caller the earliest opportunity to connect with the recipient. At the point where the LOCATIONAL DESIGNATOR HAS BEEN DETERMINED 6, the system RETRIEVES THE RECIPIENT INFORMATION 7 based on the locational designator and the dialed number. Recipient information is typically composed of the phone number of the recipient, but may include other data such as address, hours of operation or other informational messages, as deemed necessary by the client, and may be spoken by the system to the caller. Once the recipient information has been retrieved, the caller is connected to the recipient 8. This the generic embodiment that serves as a template for the majority of embodiments.

In the preferred master logic control, which involves address-level logic control, the first question is designed to provide the client an opportunity to assign a locational designator at the first response. Thus the first question is always designed to offer the caller the opportunity to identify exactly his or her location. For example, if the system is configured by the client to locate callers based on address, the first question could be "DO YOU KNOW YOUR EXACT ADDRESS?". If the caller answers in the affirmative, the caller is asked to speak the address from which he or she is calling. If the answer set described above contains a single item, the locational designator of the item can be assigned to the call.

Figure 2:
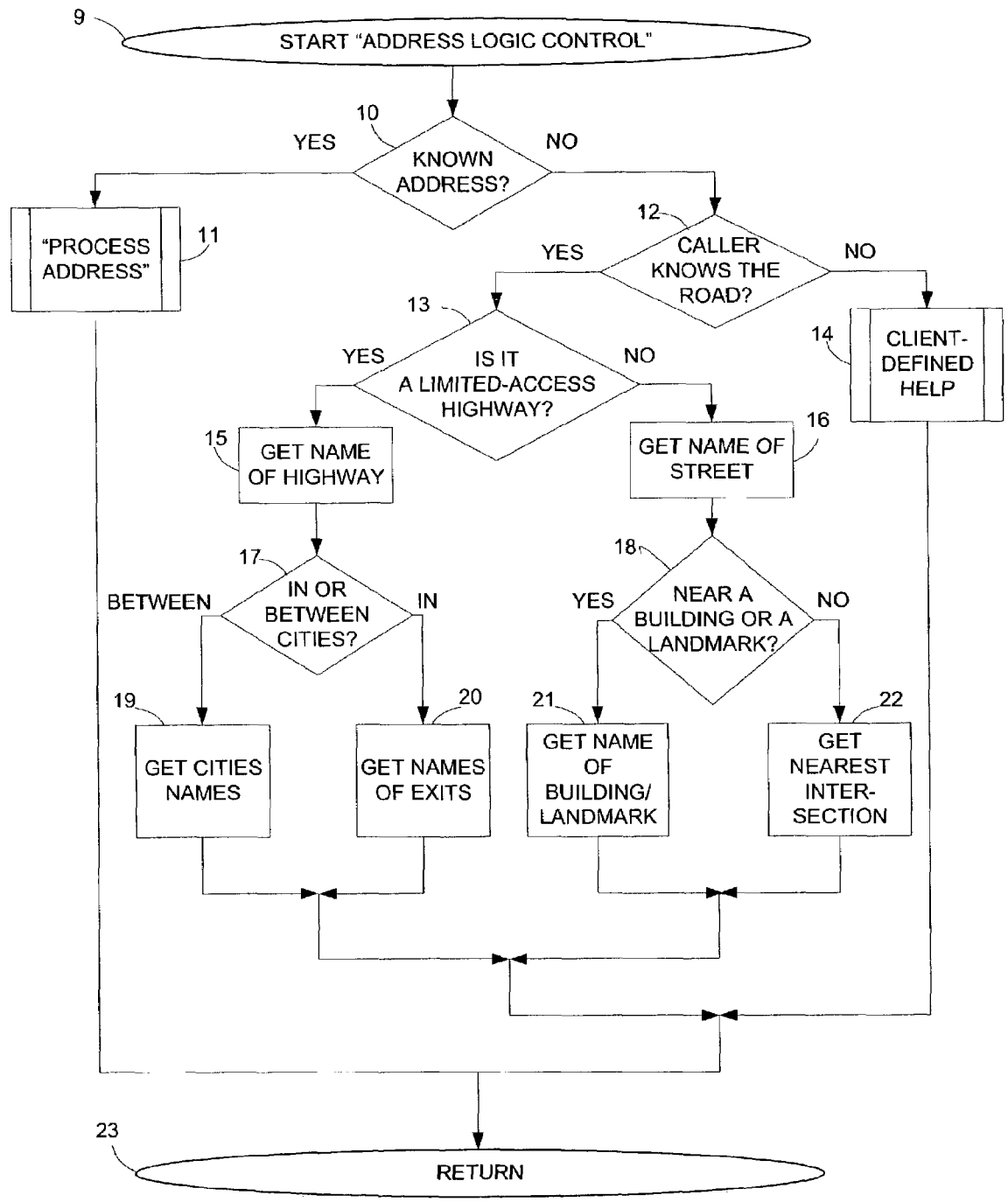
FIG. 2 is a flow diagram of the master logic of the system in its preferred embodiment.

Referring to FIG. 2, the method of this invention is best illustrated and described by a series of modules within an overall master system as shown. The address logic control 9 determines the sequence of questions, based on client-defined criteria. First, the caller is asked if he knows the address from where he is calling 10. If the caller knows the address, the rest of the call is processed through the "PROCESS ADDRESS" module 11, during which process the locational designator (in this case the latitude and longitude) is attached to the call. If the caller does not know the address, he is asked if he knows the road he is on 12. If the caller does not know the street, the call is sent to whatever help system that the client has predetermined for such an event 14. If the caller knows the street, he is asked if it is a limited-access highway 13. If the caller is calling from a limited access highway, he is asked the name of the highway 15 and whether he is calling from between two cities or within a city 16. Based on the response to the question 17, the system determines which cities the caller is between 19 or the two exits he is between 20. If the caller is not calling from a limited access highway, he is asked the name of the street he is on 16 and if he is near either a building or landmark 18. If the answer is yes, the street and building are matched against possible locational designators and the appropriate locational designator is attached 21. If the answer is no, he is asked for the nearest intersection, which is matched against possible locational designators and the appropriate locational designator is attached 22.

The call, with its attached locational designator, is now sent to the client's processing center, where the specific locational designator is applied FIG. 1 against the client-defined criteria 7 to determine which of a plurality of client locations to route the call 8.

Figure 3:
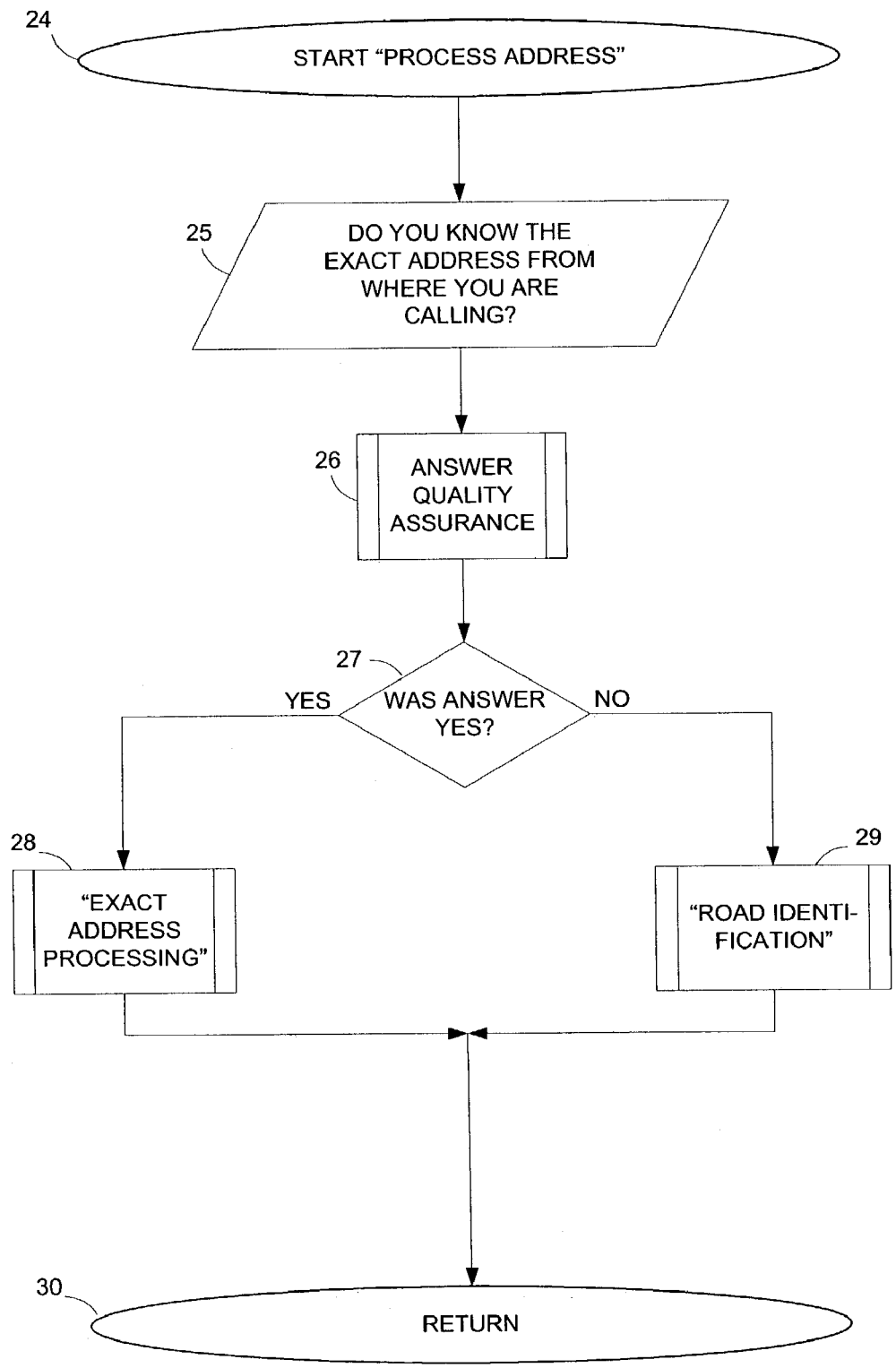
FIG. 3 is a flow diagram of the "process address" module of the system.

Referring now to FIG. 3, a caller dials the client's specialized telephone number, and the call enters the process address module 24. The system asks the caller "DO YOU KNOW THE EXACT ADDRESS THAT YOU ARE CALLING FROM?" 25 and sends the response to ANSWER QUALITY ASSURANCE 26. ANSWER QUALITY ASSURANCE makes certain that the answer provided by the caller can be used properly digitized for use by the rest of the system. Once the answer has been identified, the system checks the value returned by the AFFIRMATIVE field 27. If the value is YES, the call is sent to the module "EXACT ADDRESS PROCESSING" 28. If the value is NO, then the call is sent to the module "ROAD IDENTIFICATION" 29. Upon completion of either of these modules, the call exits through the return 30 and returns to FIG. 1, where the specific locational designator is applied against the client-defined criteria 7 to determine which of a plurality of client locations to route the call 8.

Figure 4:
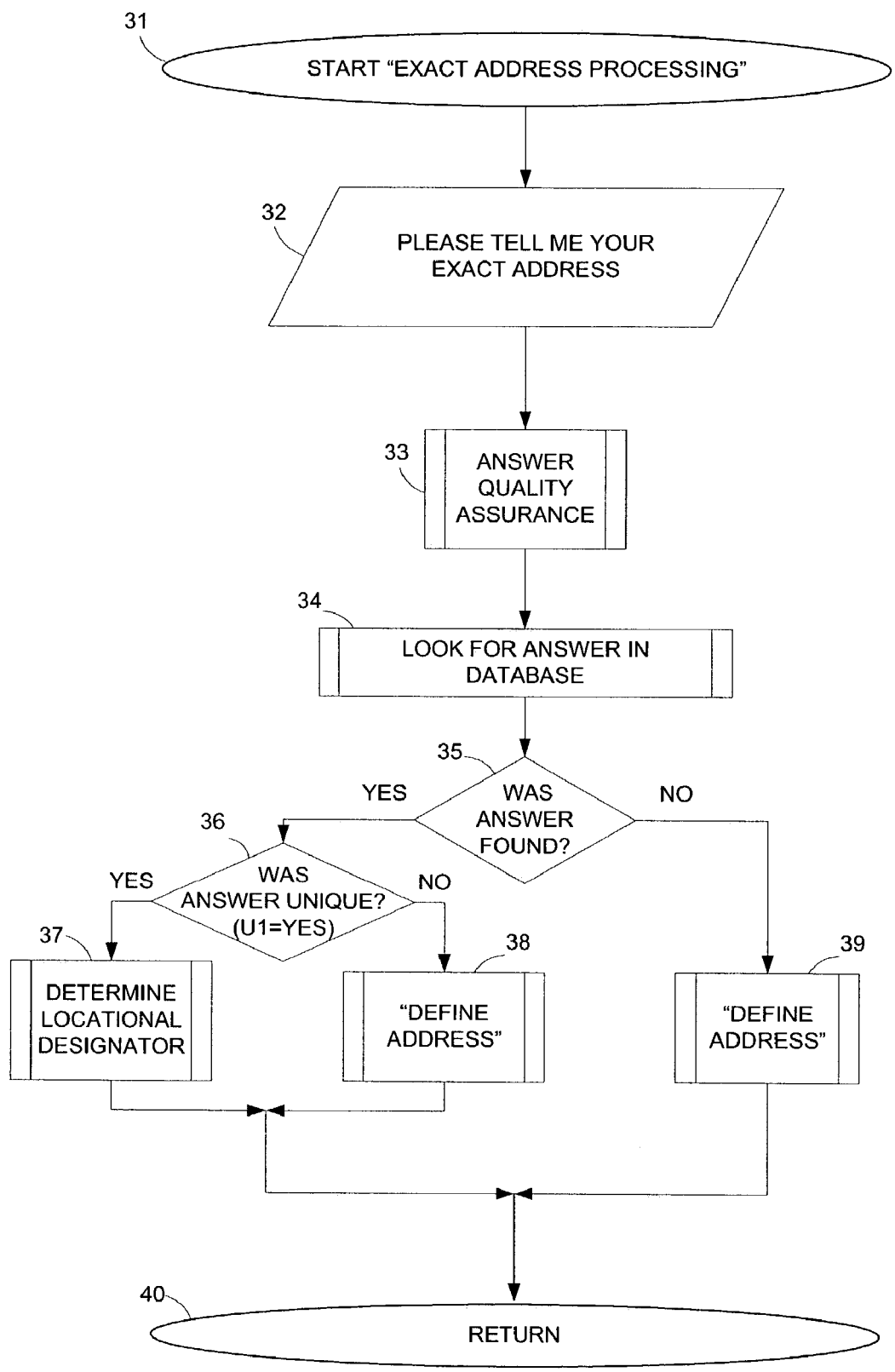
FIG. 4 is a flow diagram of the "exact address processing" module of the system.

Referring now to FIG. 4, in "START EXACT ADDRESS PROCESSING" 31, the system now asks the caller "PLEASE TELL ME YOUR EXACT ADDRESS" 32 and sends the response to ANSWER QUALITY ASSURANCE 33. ANSWER QUALITY ASSURANCE makes certain that the answer provided by the caller can be used properly digitized for use by the rest of the system. At the point where an intelligible answer has been provided, the digitized answer 34 is stored into the variable DA2 (for Digitized Answer 2). DA2 is then matched against Table 1 (tblADDRESS) containing the following fields: ADDRESS, CITY, STATE, ZIP, LAT, LON, U1, U2 and U3. As shown in Table 1 below, which is a infinitesimal portion of such a table. The table may reside in a larger database, it may be a stand-alone table, it may reside in an array in the computer's memory or, if size permits and the data rarely changes, be embedded directly into the application. If the answer was found 35 the field U1 will return a value of "YES" if the address exists only once in the table; i.e., the address is unique to the table. The field U2 is used when U1 returns a value of NO, meaning the address is not unique. A value of YES in the U2 field indicates that the address, combined with the city, is unique. The field U3 is used when both U1 and U2 are NO. If the address, city and state are unique, U3 will return a value of YES and the address exists. Each entry in the table represents a singular occurrence of address, latitude and longitude. The number of entries in the table should be sufficient to match all of the addresses in the client's area.

TABLE 1

| | tblADDRESS | | | | | | | |
|---|---|---|---|---|---|---|---|---|
| ADDRESS | CITY | ST | ZIP | LAT | LON | U1 | U2 | U3 |
| 12 Water St | Columbus | OH | 43202 | 41.578789 | −80.879879 | NO | YES | YES |
| 12 Water St | Jacksonville | FL | 32111 | 30.668852 | −73.958744 | NO | NO | YES |
| 12 Water St | Jacksonville | NC | 28905 | 33.558743 | −70.854999 | NO | NO | YES |
| 123 Main St | Miami | FL | 33049 | 26.123456 | −78.123987 | NO | YES | YES |
| 123 Main St | Orlando | FL | 32809 | 28.658336 | −74.874685 | NO | YES | YES |
| 129 Elm St | Orlando | FL | 32810 | 28.658019 | −73.945874 | YES | YES | YES |

In this table, the address, combined with city and state, is the locational designator. The locational designator can be many things, such as but not limited to, intersection, city, state or even zip code, depending on the level of specificity required by the client or the client-defined criteria.

If the caller's answer is "12 Water Ave.," that address is not found in the database, and the call is sent to "DEFINE ADDRESS" 39 to determine the actual address.

If the caller's response 36 is unique such as "129 Elm St.", the system would return a value of YES for the U1 field, assign a locational designator (in this case the LAT and LON) for 129 Elm St. This is because there is only one match for 129 Elm St. If, however, the caller's response 36 is not unique, such as 12 Water St. or 123 Main St., (both of which have multiple matches), the system returns a value of NO from the U1 field.

If the value for U1 is YES and the locational designator is returned, and attached to the call 37. Upon completion of either of these modules, the call returns 40 returns to FIG. 1, applying the lat/lon to the client's criteria 7 (FIG. 1).

If the value for U1 is NO, then the call is sent to the "DEFINE ADDRESS" module 38. In the case of a system where the client is the US Postal Service, the locational designator might be defined as a zip code, and the questions designed to determine from which zip code the caller is calling. Other locational designators can be can be generated by a client to match whatever postal geography a postal service may define. This is an example of a case when the locational designator would not ultimately translate to latitude and longitude.

Figure 5:
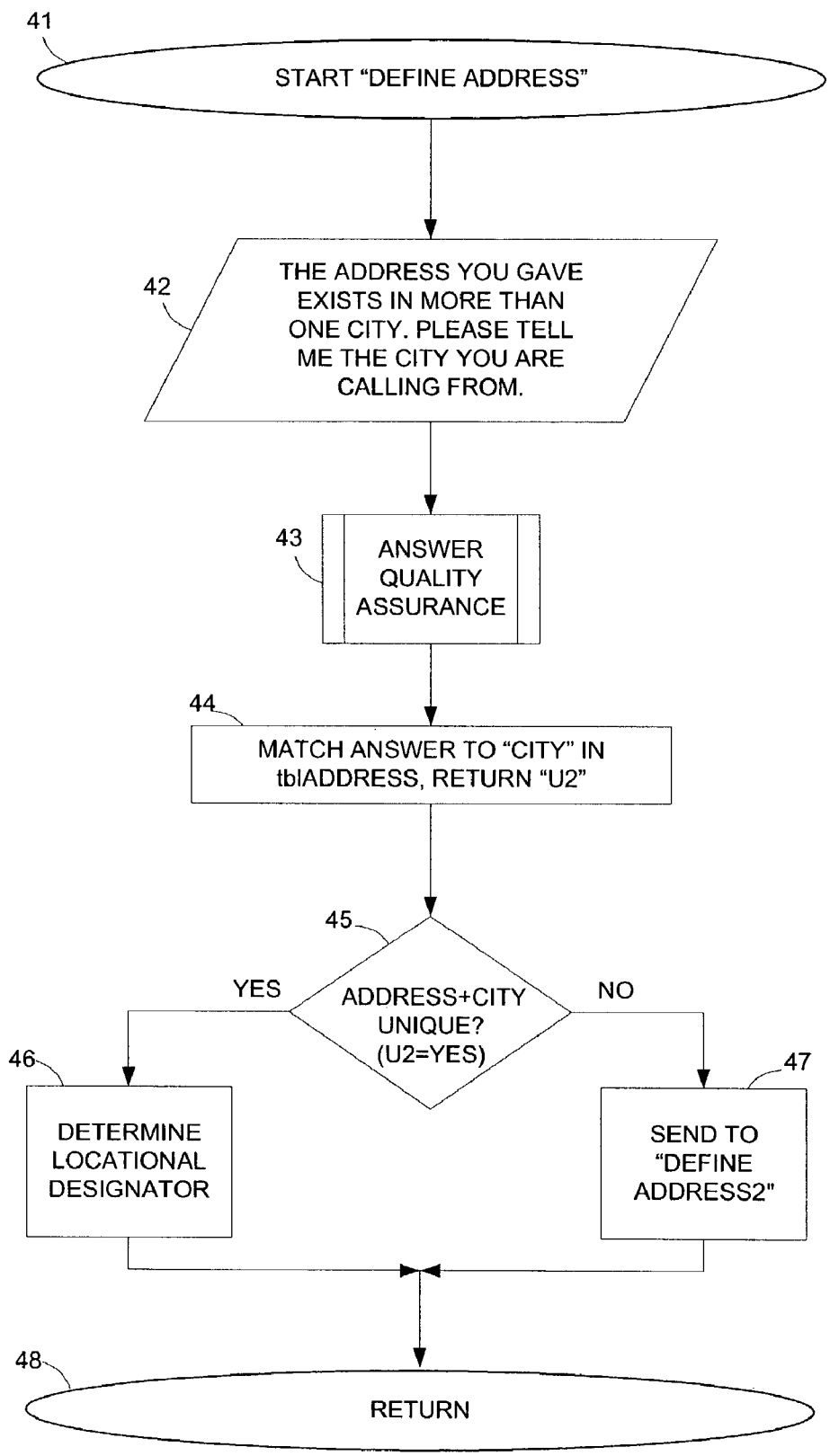
FIG. 5 is a flow diagram of the "define address" module.

Referring to FIG. 5, at the start of the "DEFINE ADDRESS" module 41, the system now prompts the caller "THE ADDRESS YOU GAVE EXISTS IN MORE THAN ONE CITY. PLEASE TELL ME THE CITY YOU ARE CALLING FROM" 42, and sends the response to ANSWER QUALITY ASSURANCE 43. ANSWER QUALITY ASSURANCE makes certain that the answer provided by the caller can be used properly digitized for use by the rest of the system. Once the caller has provided the name of a city 44, the system searches a database of addresses, for instance like Table 1 (tblADDRESS) for the row containing the address given in FIG. 4 and the city given in FIG. 5. Once the system finds that row, it looks at the column U2. If the value in U2 is YES 45, the address and city are unique, and the locational designator is attached to the call 46. For example, referring to Table 1 (tblADDRESS), if the caller gave an address of 12 Water Street, and a city of Jacksonville, the value for U2 would be NO, indicating that the address and city occur in more than one state. If, however, the address and city were 123 Main Street and Miami, U2 would be YES, indicating that this address and city combination is unique. If the value for U2 is yes, the lat/lon is attached and the call exits through module 48, and returns to FIG. 1, applying the lat/lon to the client's criteria 7. If, however the value for U2 is NO, the call is sent to the "define address 2" module 47.

Figure 6:
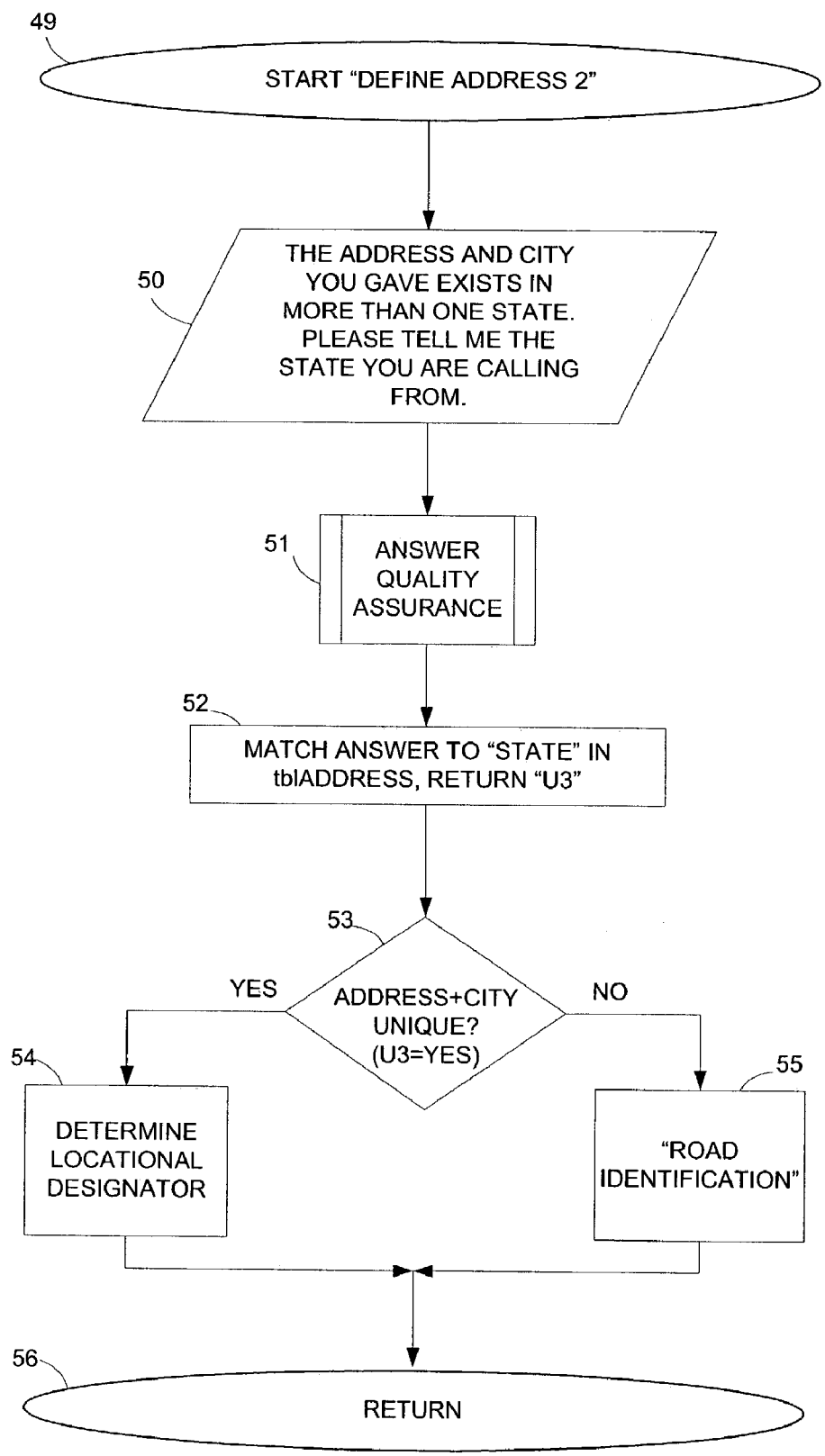
FIG. 6 is a flow diagram of the "define address 2" module.

Referring now to FIG. 6, at the start of the "DEFINE ADDRESS 2" module 49, should the tests for address and city in FIG. 4 and FIG. 5 fail to return a unique value, the call goes here. The system now prompts the caller "THE ADDRESS AND CITY YOU GAVE EXIST IN MORE THAN ONE STATE. PLEASE TELL ME THE STATE YOU ARE CALLING FROM" 50 and sends the response to ANSWER QUALITY ASSURANCE 51. ANSWER QUALITY ASSURANCE makes certain that the answer provided by the caller can be used properly digitized for use by the rest of the system. Once the caller has provided the name of a state 52, the system searches the Table 1 tblADDRESS for row containing the address given in FIG. 4, the city given in FIG. 5, and the state given in FIG. 6. Once the system finds that row, it looks at the column U3. If the value in U3 is YES 53, the address and city are unique, and the locational designator is attached to the call 54. For example, referring to tblADDRESS, the address, city and state given were 12 Water Street, Jacksonville, Fla., U3 would be YES, indicating that this address and city combination is unique. If, however the, value for U3 is NO, the call, is sent to the "ROAD IDENTIFICATION" module 55. Upon completion of either of these modules, the call exits through module 56 and returns to FIG. 1, where the specific locational designator is applied against the client-defined criteria 7 to determine which of a plurality of client locations to route the call 8.

FIG. 3, FIG. 4, FIG. 5, and FIG. 6 represent the logic tree providing the caller knows the exact address from where he is calling. The invention also provides a methodology for those instances where the caller does not know the address, indicated by the "ROAD IDENTIFICATION" 29 box on FIG. 3.

Figure 7:
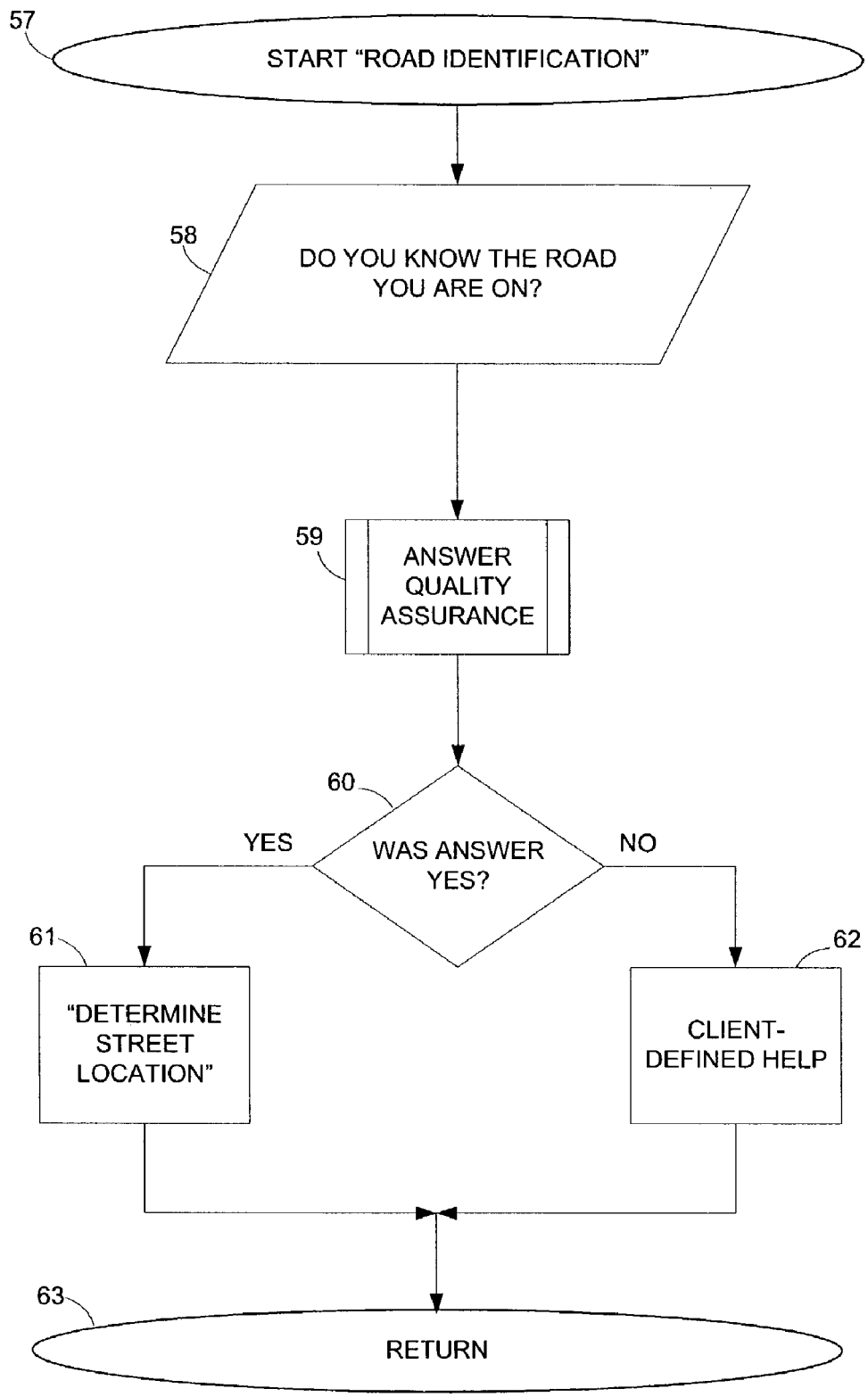
FIG. 7 is a flow diagram of the "road identification" module.

Referring now to FIG. 7, at the start of the "ROAD IDENTIFICATION" module 57, should the caller not know his address from FIG. 3, the call goes here. The system now prompts the caller "DO YOU KNOW THE ROAD YOU ARE ON?" 58 and sends the response to ANSWER QUALITY ASSURANCE 59. ANSWER QUALITY ASSURANCE makes certain that the answer provided by the caller can be used properly digitized for use by the rest of the system. If the caller knows the road he is on 60, the call is sent to the "DETERMINE STREET LOCATION" 61 module. If the caller does not know the road he is on, the call is then sent to a client-defined help system 62 and then returned to 63.

Figure 8:
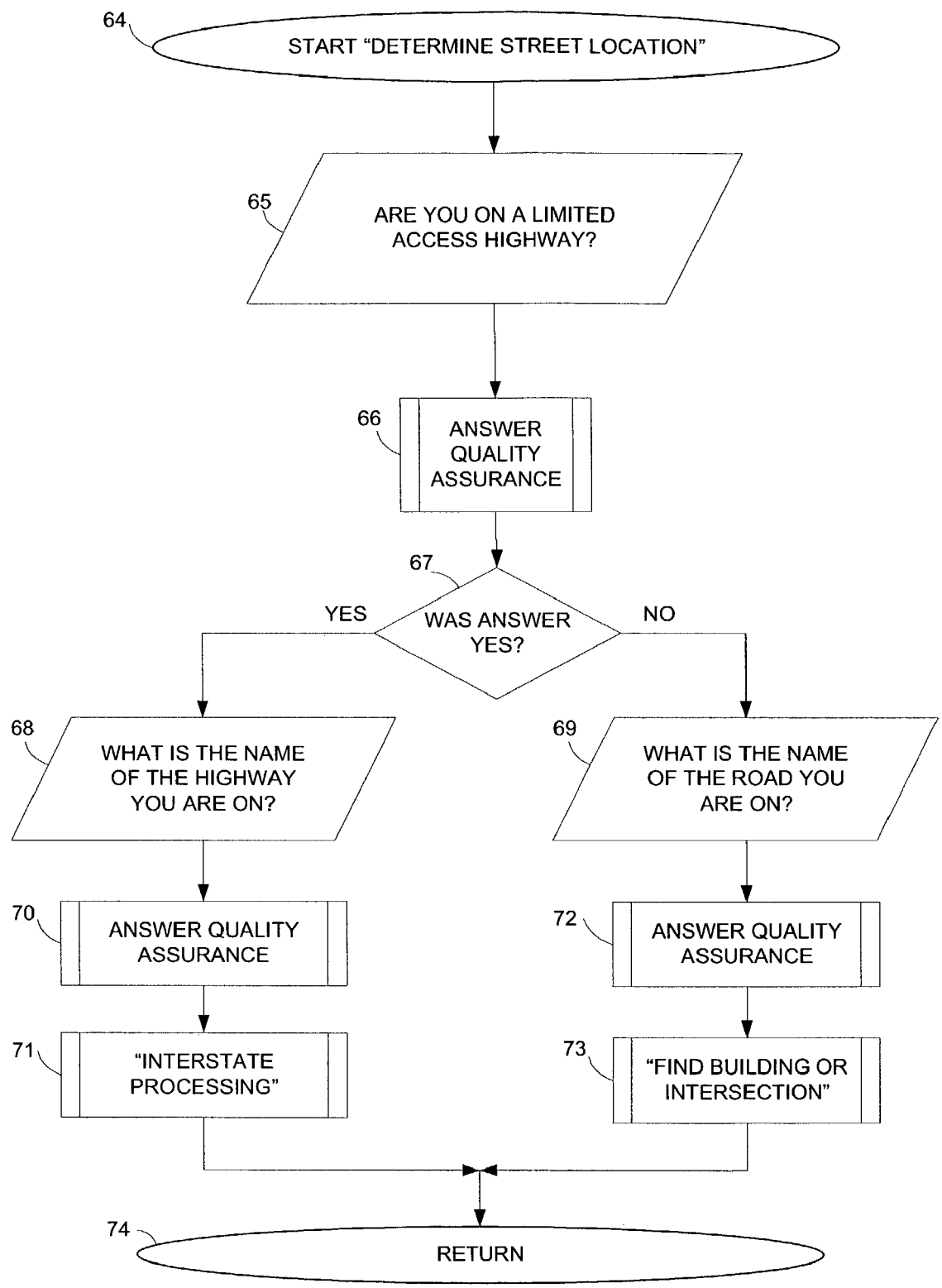
FIG. 8 is a flow diagram of the "determine street location" module.

Referring now to FIG. 8, should the caller know his address from FIG. 7, the call goes here ("DETERMINE STREET LOCATION") 64. The system now prompts the caller "ARE YOU ON A LIMITED ACCESS-HIGHWAY SUCH AS AN INTERSTATE OR FREEWAY?" 65 and sends the response to ANSWER QUALITY ASSURANCE 66. ANSWER QUALITY ASSURANCE makes certain that the answer provided by the caller can be used properly digitized for use by the rest of the system. Once the answer has been identified, if the caller is on a limited access highway 67, he is asked the name of that highway 68. The system then sends the response to ANSWER QUALITY ASSURANCE 70. ANSWER QUALITY ASSURANCE makes certain that the answer provided by the caller can be used properly digitized for use by the rest of the system. The call is then sent to "INTERSTATE PROCESSING" 71 module. The response is stored to the variable "interstate1".

If the caller is not on a limited access highway, he is asked the name of the road 69. The response is sent to ANSWER QUALITY ASSURANCE 72. ANSWER QUALITY ASSURANCE makes certain that the answer provided by the caller can be used properly digitized for use by the rest of the system. Once the answer has been identified, the validated response is stored in "road1" and the call is sent to the "FIND BUILDING OR INTERSECTION" 73 module. The call returns 74 to FIG. 7, exiting the module 61, and passing through 63 as previously described.

Figure 9:
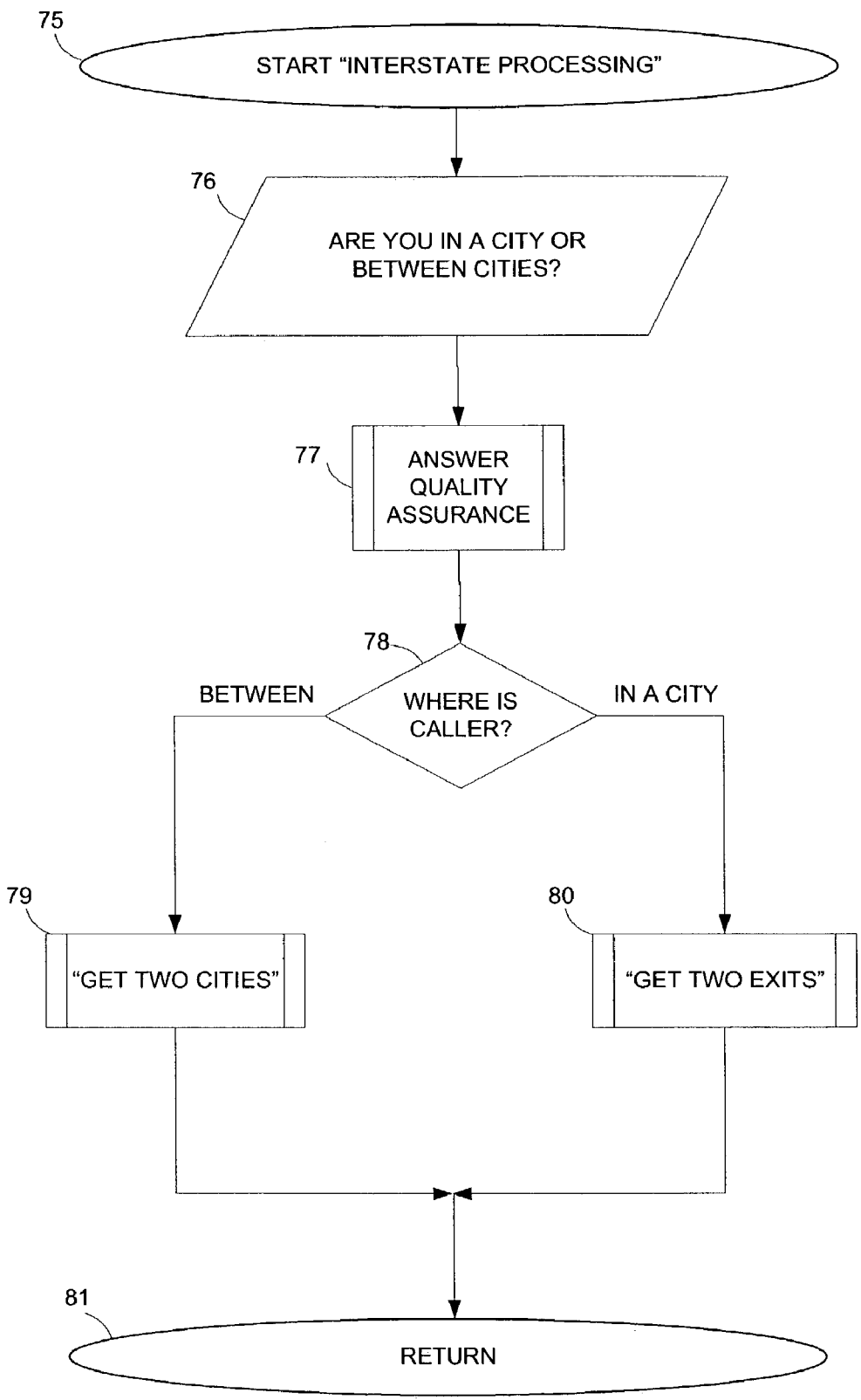
FIG. 9 is a flow diagram of the "interstate processing" module.

Referring now to FIG. 9, at the "START INTERSTATE PROCESSING" 75 the system knows the highway that the caller is on, and also knows where each highway begins and ends. It also knows (in the case of an interstate or US Highway) in which general direction the highway runs, east-west or north-south. In other words, the interstate runs from city1 to city2. The system now prompts the caller "ARE YOU BETWEEN CITIES OR IN A CITY? 76" and the response is sent to ANSWER QUALITY ASSURANCE 77. ANSWER QUALITY ASSURANCE makes certain that the answer provided by the caller can be used properly digitized for use by the rest of the system. If the caller is between cities 78, the call is sent to the "GET TWO CITIES" 79 module. If the caller is in a city, the call is sent to "GET TWO EXITS" 80 module. Upon completion of "GET TWO CITIES" 79 or "GET TWO EXITS" 80, the call returns 81 to FIG. 871 as previously described.

Figure 10:
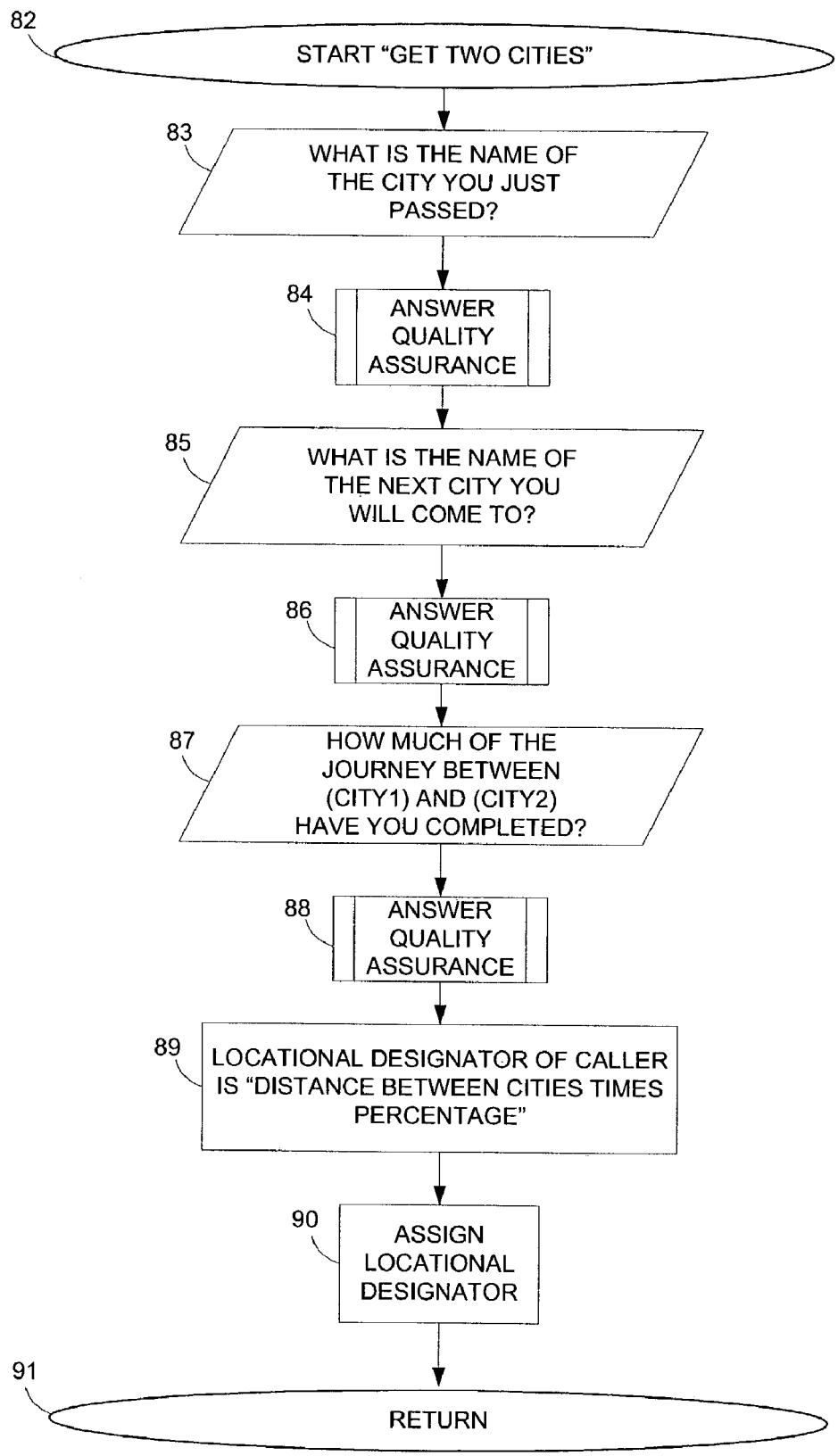
FIG. 10 is a flow diagram of the "get two cities" module.

Referring now to FIG. 10, for the start "GET TWO CITIES" module 82, the system now prompts the caller "WHAT IS THE NAME OF THE CITY YOU JUST PASSED?" 83 and sends the response to ANSWER QUALITY ASSURANCE 84. ANSWER QUALITY ASSURANCE makes certain that the answer provided by the caller can be used properly digitized for use by the rest of the system. Once the answer has been identified, the response is stored to the variable "city1."

Once the caller has provided city1, The system now prompts the caller "What is the name of the next city you will come to? 85 "and sends the response to ANSWER QUALITY ASSURANCE 86. ANSWER, QUALITY ASSURANCE makes certain that the answer provided by the caller can be used properly digitized for use by the rest of the system. Once the answer has been identified, the response is stored to the variable "city2."

Once the caller has provided city1 and city2, the system now prompts the caller "HOW MUCH OF THE JOURNEY BETWEEN (CITY1) AND (CITY2) DID YOU COMPLETE, IN TERMS OF A PERCENTAGE?" 87 and sends the response to ANSWER QUALITY ASSURANCE 88. ANSWER QUALITY ASSURANCE makes certain that the answer provided by the caller can be used properly digitized for use by the rest of the system. Once the answer has been identified, the response is stored to the variable "percentage".

It would be obvious to one skilled in the art to substitute a number of variations of distance calculation other than percentage of distance driven, such as but not limited to, using mileage markers, the classical distance formula (distance expressed as the product of rate of travel and duration of travel) and using exit numbers.

Referring now to Table 2 (tblINTERSTATE), the table-contains the following fields:

$$Callerlat = minlat + ((maxlat - minlat) * percentage),$$

$$Callerlon = minlon + ((maxlon - minlon) * percentage).$$

If the EXITNUM for city2 is greater than the EXITNUM for city1, then lat2 is the LAT for the lowest EXITNUM in city2; lat1 is the value of LAT for the highest EXITNUM in city1. Likewise, lon2 is the LON for the lowest EXITNUM in city2; lon1 is the value of LON for the highest EXITNUM in city1.

If, however, the EXITNUM for city2 is less than the EXITNUM for city1(which would happen if the caller traveled from Sanford to Orlando), then lat1 is the LAT of lowest EXITNUM in city1; lat2 is the LAT for the highest EXITNUM in city2. Likewise, lon1 is the LON of lowest EXITNUM in city1; lont2 is the LON for the highest EXITNUM in city2.

Upon completion of the locational designator calculation 89, the locational designator (in this case lat/lon) is attached to the call 90, the call exits through module 91 and returns to FIG. 1, where the specific locational designator is applied against the client-defined criteria 7 to determine which of a plurality of client locations to route the call 8.

TABLE 2

| Field name | data description |
|---|---|
| INTERSTATE1 | limited access highway name |
| WAYPOINT | city along the highway |
| EXITNAME | the name of the exit (Main St, $14^{th}$ St, etc.) |
| EXITNUM | the exit number (exit 46, exit 112, etc.) |
| LAT | the latitude of the exit |
| LON | the longitude of the exit |

(tblINTERSTATE)

| INTERSTATE1 | WAYPOINT | EXITNAME | EXITNUM | LAT | LON |
|---|---|---|---|---|---|
| 4 | Tampa | I-275 | 0 | 27.571020 | −82.265576 |
| 4 | Orlando | US 441 | 33 | 28.304615 | −81.235181 |
| 4 | Orlando | SR 50 | 41 | 28.331061 | −81.224895 |
| 4 | Orlando | Fairbanks | 45 | 28.352801 | −81.222380 |
| 4 | Orlando | Lee | 46 | 28.363915 | −81.223975 |
| 4 | Sanford | SR 46 | 52 | 28.494161 | −81.183856 |
| 4 | Cassedega | | 54 | 28.575856 | −81.142953 |
| 4 | Lake Helen | | 56 | 29.027000 | −81.142581 |
| 4 | Daytona | I-95 | 58 | 29.922760 | −81.435280 |

As before, the table may reside in a larger database, it may be a stand-alone table, it may reside in an array in the computer's memory or, if size permits and the data rarely changes, be embedded directly into the application. Let us assume the caller has said he is calling from Interstate 4, that he just left Orlando (city1), is heading towards Sanford (city2); and completed 50% of the trip between the two cities. The system assigns a lat/lon to the call by first looking for city1. When it finds the first occurrence of city1 in the WAYPOINT field, it looks at the value in the corresponding EXITNUM field; in this case, it finds Orlando and 33. The system then looks for city2 in the WAYPOINT field, and captures the value of the corresponding EXITNUM field.

The highest and lowest values for LAT, corresponding to the LAT of city1 and city1, are stored in the variables maxlat and minlat, respectively. The highest and lowest values for LON, corresponding to the LON of city1 and city1, are stored in the variables maxlon and minlon, respectively.

Figure 11:
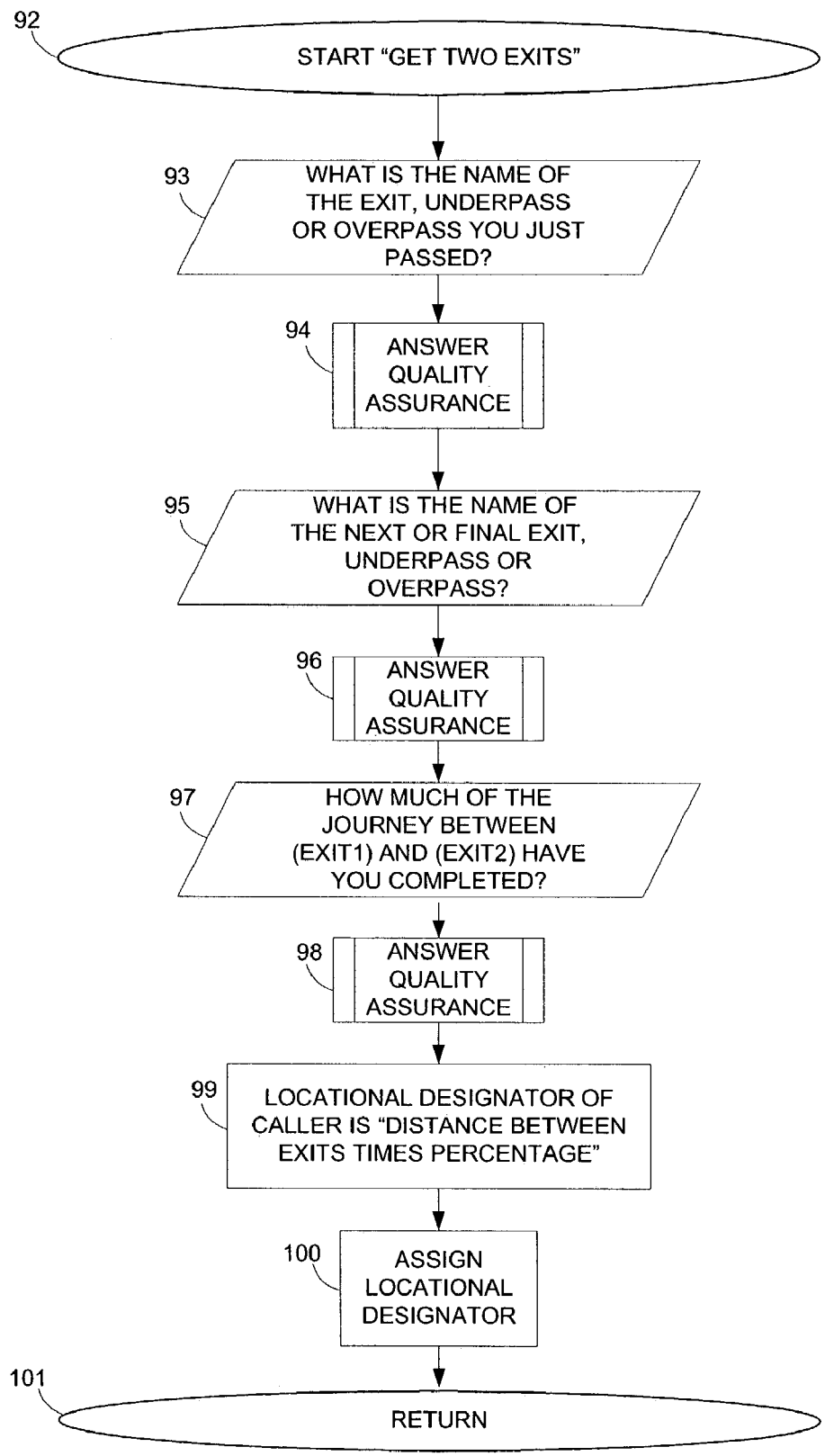
FIG. 11 is a flow diagram of the "get two exits" module.

The caller's latitude (callerlon) and longitude (callerlat) are computed using the following formula:

Referring now to FIG. 11, to the start "GET TWO EXITS" module 92, the system now prompts the caller "WHAT IS THE NAME OF LAST EXIT YOU PASSED?" 93 and sends the response to ANSWER QUALITY ASSURANCE 94. ANSWER QUALITY ASSURANCE makes certain that the answer provided by the caller can be used properly digitized for use by the rest of the system. Once the answer has been identified, the response is stored to the variable "exit1."

Once the caller has provided exit1, the system now prompts the caller "WHAT IS THE NAME OF THE NEXT EXIT YOU WILL COME TO?" 95 and sends the response to ANSWER QUALITY ASSURANCE 96. ANSWER QUALITY ASSURANCE makes certain that the answer provided by the caller can be used properly digitized for use by the rest of the system. Once the answer has been identified, the response is stored to the variable "exit2."

Once the caller has provided exit1 and exit2, the system now prompts the caller "How much of the journey between (exit1) and (exit2) did you complete, in terms of a percentage?" 97 and sends the response to ANSWER QUALITY ASSURANCE 98. ANSWER QUALITY ASSURANCE makes certain that the answer provided by the caller can be used properly digitized for use by the rest of the system. Once the answer has been identified, the response is stored to the variable "percentage."

Refer back to Table 2 (tblINTERSTATE). Let us assume the caller has said he is calling from Interstate 4, that he is in Orlando, just passed the Fairbanks exit (exit1) and is heading towards the Lee exit (exit2), and completed 50% of the trip between the two exits. The system assigns a lat/lon to the call by first looking for exit1. When the system finds exit1 in the EXITNAME field it looks at the value in the corresponding EXITNUM field; in this case, it finds an EXITNUM of 45. The system then looks for exit2 in the EXITNAME field, and captures the value of the corresponding EXITNUM field, in this case 46.

The highest and lowest values for LAT, corresponding to the LAT of city1 and city1, are stored in the variables maxlat and minlat, respectively. The highest and lowest values for LON, corresponding to the LON of city1 and city1, are stored in the variables maxlon and minlon, respectively.

If the EXITNUM for exit 2 is greater than the EXITNUM for exit1, the caller's latitude (callerlon) and longitude (callerlat) are computed using the following formula:

Callerlat=minlat+((maxlat−minlat)*percentage),

Callerlon=minlon+((maxlon−minlon)*percentage).

If, however, the EXITNUM for exit2 is less than the EXITNUM for exit1 (which would happen if the caller traveled from Lee to Fairbanks) the caller's latitude (callerlon) and longitude (callerlat) are computed using the following formula:

Callerlat=maxlat−((maxlat−minlat)*percentage),

Callerlon=maxlon−((maxlon−minlon1)*percentage).

Upon completion of the calculations 99, the location designator (in this case lat/lon) is attached to the call 100, the call exits through module 101 and returns to FIG. 1, where the specific locational designator is applied against the client-defined criteria 7 to determine which of a plurality of client locations to route the call 8.

As previously described, it would be obvious to one skilled in the art to substitute a number of variations of distance calculation other than percentage of distance driven, such as but not limited to, using mileage markers, the classical distance formula (distance expressed as the product of rate of travel and duration of travel) and using exit numbers.

Figure 12:
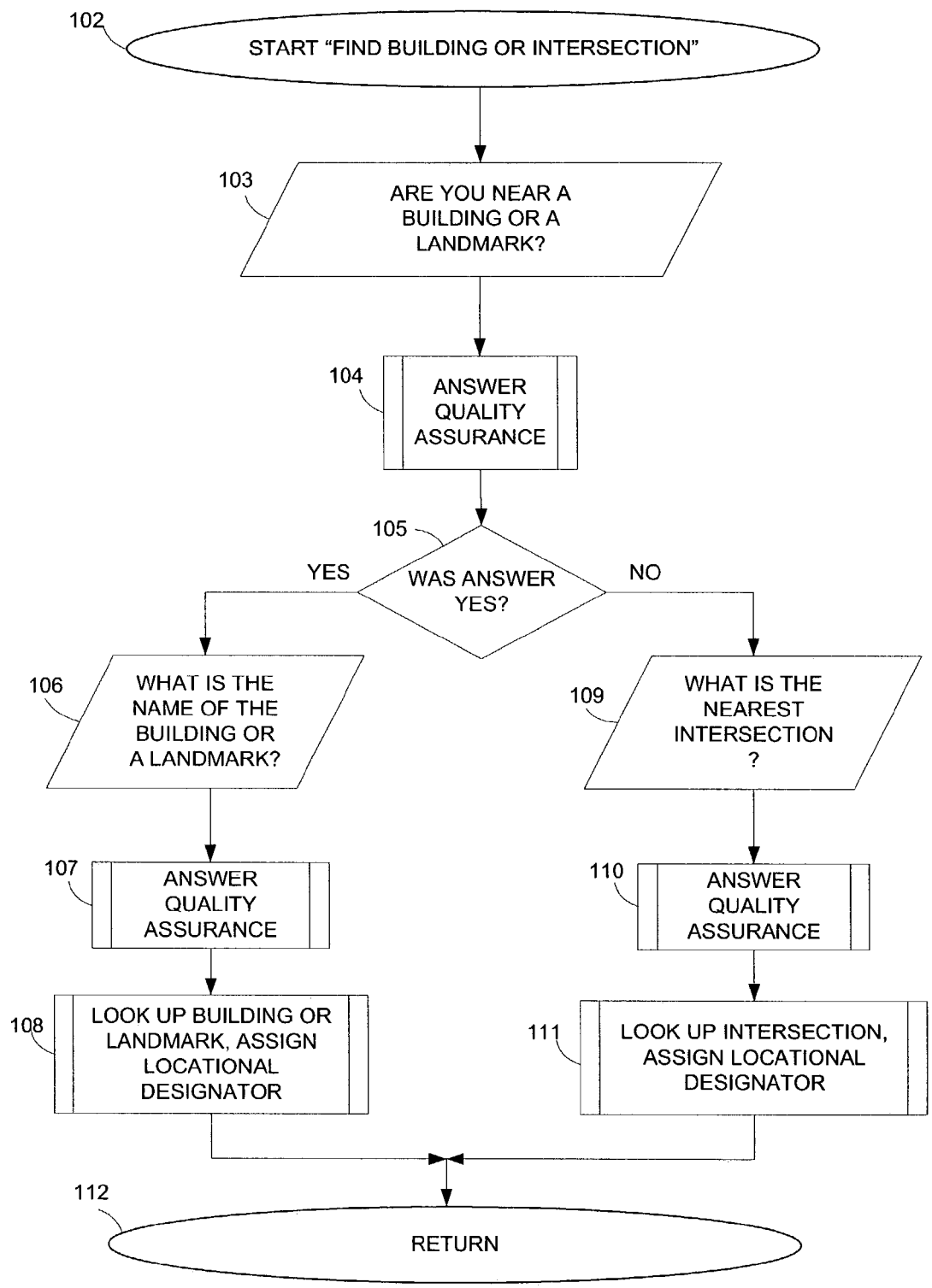
FIG. 12 is a flow diagram of the "find building or intersection" module.

Referring now to FIG. 12, to the start "FIND BUILDING OR INTERSECTION" module 102, the system now prompts the caller "ARE YOU NEAR A BUILDING OR A LANDMARK?" 103. and sends the response to ANSWER QUALITY ASSURANCE 104. ANSWER QUALITY ASSURANCE makes certain that the answer provided by the caller can be used properly digitized for use by the rest of the system. If the verified answer is "Yes" 105, the system then asks the question "WHAT IS THE NAME OF THE BUILDING OR THE LANDMARK?" 106 and sends the response to ANSWER QUALITY ASSURANCE 107. ANSWER QUALITY ASSURANCE makes certain that the answer provided by the caller can be used properly digitized for use by the rest of the system. Once the answer has been identified, the answer is stored in the variable "findsite".

Refer now to Table 3 (tblLANDMARKS). This table contains the following fields: STREETNAME, SITENAME, LAT AND LON. For simplicity, this table is populated with only a small sample of hotels. It would be obvious for one skilled in the art to populate the table with other visually identifiable references, such as businesses, buildings, monuments, billboards, natural formations or any other type feature the client wishes to use as locational designators. The "LOOK UP" module 108 searches the table for a value in the STREETNAME that matches "road1" from FIG. 8 and for a value in the SITENAME field that matches findsite, and assigns the corresponding LAT and LON to the call. The lat/lon is attached to the call, and exits through module 1112, and returns to FIG. 1, applying the lat/lon to the client's criteria 7.

TABLE 3

(tblLANDMARKS)

| STREETNAME | SITENAME | LAT | LON |
| --- | --- | --- | --- |
| Clarion Plaza Hotel | International Dr | 28.447916 | −81.470905 |
| Omni Hotel | International Dr | 28.445716 | −81.471105 |
| Solage Hotel | International Dr | 28.461917 | −81.465205 |
| Premier Hotel | International Dr | 28.459417 | −81.469205 |
| Las Palmas Hotel | International Dr | 28.461917 | −81.465105 |
| Embassy Suites Hotel | International Dr | 28.457601 | −81.471005 |
| Radisson Hotel | International Dr | 28.457516 | −81.471005 |
| Summerfield Suites Hotel | International Dr | 28.457501 | −81.471005 |
| Castle Hotel | International Dr | 28.457516 | −81.471305 |
| Howard Johnson Hotel | International Dr | 28.290161 | −81.407706 |

As before, the table may reside in a larger database, it may be a stand-alone table, it may reside in an array in the computer's memory or, if size permits and the data rarely changes, be embedded directly into the application. If the answer to "ARE YOU NEAR A BUILDING OR A LANDMARK?" 105 is "No", the system then asks the question "WHAT IS THE NEAREST INTERSECTION? 109" and sends the response to ANSWER QUALITY ASSURANCE 110. ANSWER QUALITY ASSURANCE makes certain that the answer provided by the caller can be used properly digitized for use by the rest of the system. Once the answer has been verified, the answer is stored in the variable "findcross."

Referring now to Table 4 (tblINTERSECTIONS). This table contains the following fields: STREETNAME, CROSSES, LAT AND LON. The system searches the table 111 for a value in the STREETNAME that matches "road1" from FIG. 8 and for a value in the CROSSES field that matches findcross, and assigns the corresponding locational designator to the call. Upon selection of the location designator (in this case lat/lon the call exits through module 112 and returns to FIG. 1, where the specific locatiorial designator is applied against the client-defined criteria 7 to determine which of a plurality of client locations to route the call 8.

TABLE 4

(tblINTERSECTIONS)

| STREETNAME | CROSSES | LAT | LON |
| --- | --- | --- | --- |
| Main St | $1^{st}$ Ave | 29.107543 | −81.459347 |
| Main St | $2^{nd}$ Ave | 29.110397 | −81.459347 |
| Main St | $3^{rd}$ Ave | 29.111357 | −81.459347 |
| Main St | $4^{th}$ Ave | 29.112874 | −81.459347 |
| Main St | $5^{th}$ Ave | 29.116543 | −81.459347 |
| Main St | $6^{th}$ Ave | 29.118827 | −81.459347 |

As before, the table may reside in a larger database, it may be a stand-alone table, it may reside in an array in the computer's memory or, if size permits and the data rarely changes, be embedded directly into the application.

Figure 13:
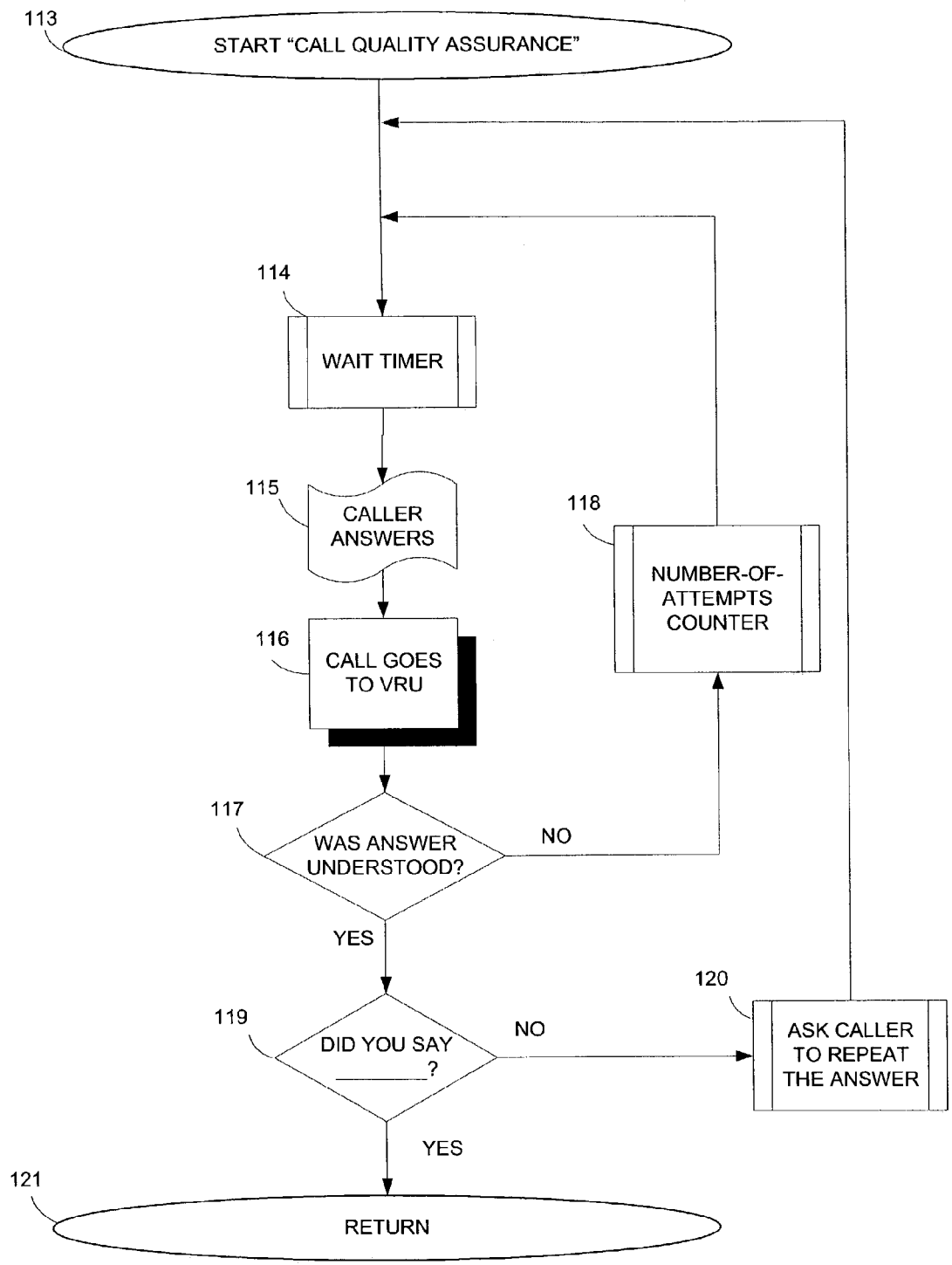
FIG. 13 is a flow diagram of the "call quality assurance" module.

FIG. 13 is the ANSWER QUALITY ASSURANCE module, which handles all of the voice processing, error correction and answer validation. In addition to the checks and balances herein described, it may be desirous of the client to add additional dictionaries, error traps and validation techniques to provide increasingly accurate answers to the rest of the system. By isolating the voice processing in a module, call quality control is centralized and standardized.

Referring now to FIG. 13, which is the, which is the ANSWER QUALITY ASSURANCE module 113, the length of time that the system waits for a response is determined by the client and is set in the "WAIT TIMER" module 114. Should the caller provide no response, the client can predetermine the action to be taken: terminate the call, play a warning message, send the call to a live operator, etc. When the caller responds to the question 115, the answer is sent to the Voice Recognition Unit (VRU) 116. If the VRU determines that the caller's response cannot be understood 117, the call is sent to the "NUMBER-OF-ATTEMPTS COUNTER" 118. The question/answer process is repeated until either the caller provides an intelligible answer or the number of attempts equals the NUMBER-OF-ATTEMPTS-LIMIT set by the client. If the caller cannot provide an intelligible answer, the system can take an action predetermined by the client, such as playing a warning message, terminating the call, or connecting the call to a live operator. At the VRU, the answer is digitized and is stored to the variable "DA" (for "Digitized Answer"). The program then searches for DA in a table of key words (tblKEYWORDS) (see Table 5), such as "Yes", "No", and their vernacular equivalents, for example. If the DA is found in the table, the value of the AFFIRMATIVE field is passed back to the system. The table tblKEYWORDS can contain whatever key words the client deems necessary.

TABLE 5 tblKEYWORDS

| DA | AFFIRMATIVE |
|---|---|
| Yes | YES |
| No | NO |
| Yup | YES |
| Uh-huh | YES |
| Nope | NO |

As before, the table may reside in a larger database, it may be a stand-alone table, it may reside in an array in the computer's memory or, if size permits and the data rarely changes, be embedded, directly into the application. The table tblKEYWORDS can be configured to recognize DA in a number of different languages (see Table 6 tblKEYWORDS2). By adding additional columns to the table, additional keywords from other languages can be included. As described before, the program searches for DA in the table. Upon locating DA, the program looks at the corresponding field "Translator" for a value in that field other than "default". If the value for "Translator" is something other than "default", then the program processes the rest of the program in that language key.

The system also performs caller answer autocorrection. It is possible for an answer to be interpreted differently from the intent of the caller. For verification purposes, the system repeats the answer back to the caller in the form of a question 119. "DID YOU SAY_____?". If the caller indicates that the answer retained by the system is not the answer the caller intended to give, the system ASKS THE CALLER TO REPEAT THE ANSWER 120. This process can be repeated until the limit of the NUMBER-OF-ATTEMPTS COUNTER is reached. At the point where the caller affirms that the answer has been properly understood, the system exits through 120 to continue processing in the module from which it was called. This process ensures call processing based on accurate data.

TABLE 6 tblKEYWORDS

| DA | AFFIRMATIVE | Translator |
|---|---|---|
| Yes | YES | Default |
| No | NO | Default |
| Yup | YES | Default |
| Uh-huh | YES | Default |
| Nope | NO | Default |
| Da | YES | Russian |
| Oui | YES | French |
| Si | YES | Spanish |

As before, the table may reside in a larger database, it may be a stand-alone table, it may reside in an array in the computer's memory or, if size permits and the data rarely changes, be embedded directly into the application.

Figure 14:
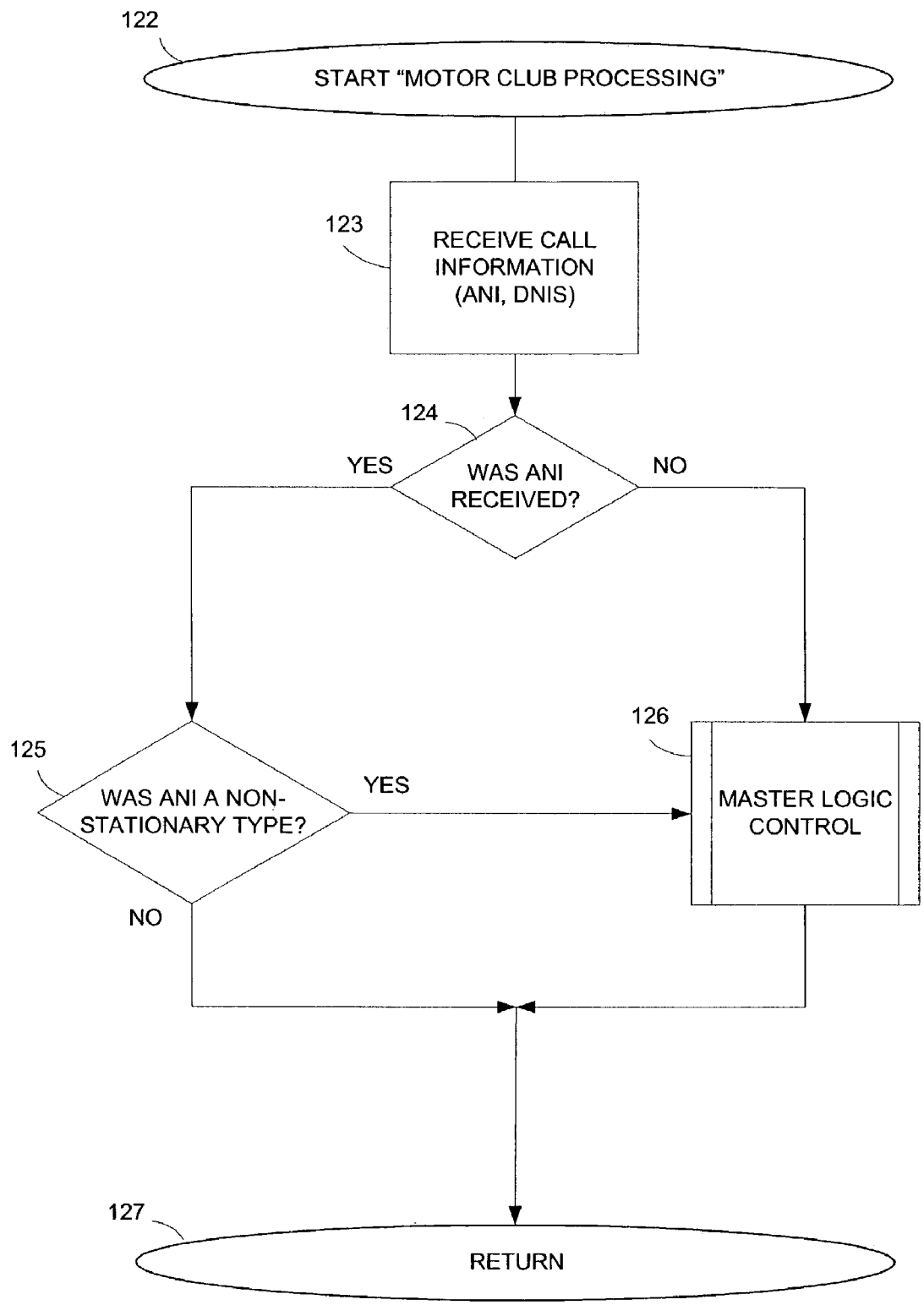
FIG. 14 is a flow diagram of an embodiment as a module within an emergency roadside services application.

Referring now to FIG. 14, which is demonstrative of embodiment of the invention in a "motor club" application 122, the system receives the call information 123, which may include the ANI and DNIS. If the ANI was not received 124, the call proceeds to Master Logic Control 126. If the ANI was received, the system checks for the condition 125 "WAS THE ANI NON-STATIONARY?" If the ANI is from a stationary phone, the call is returned 127 to standard processing, which is whatever normal process the client has defined to handle the call. Returning to Master Logic Control 126, the client uses client-defined criteria to determine the caller's locational designator, and the locational designator is sent, thus allowing for the call to be processed, in much the same way as calls with a valid ANI and DNIS. The operator now has the caller location information available, whether the call was placed from a mobile or land-based phone.

Figure 15:
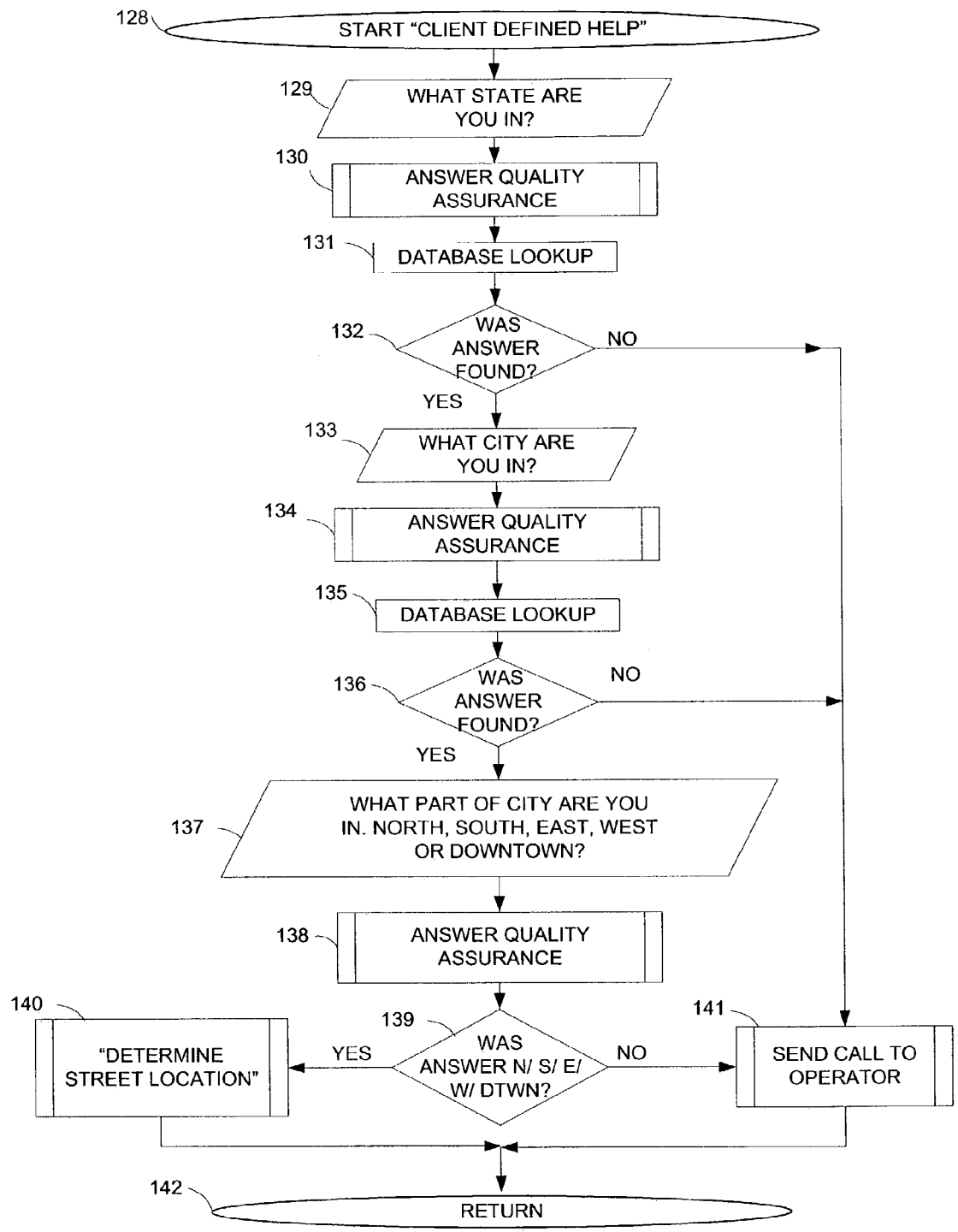
FIG. 15 is a flow diagram representative of a "client-defined help" module.

Referring now to FIG. 15, which is demonstrative of a client-defined help module 128, the system asks 129 "WHAT STATE ARE YOU IN?" and the system sends the answer to ANSWER QUALITY ASSURANCE 130. The validated answer is then matched in the database 131. If the answer is not found 132, the call is routed to the operator for manual assistance 141. If the answer is found 132, the caller is asked "WHAT CITY ARE YOU IN?" 133." and the system sends the answer to ANSWER QUALITY ASSURANCE 134. The validated answer is then matched in the database 135. If the answer is not found 136, the call is routed to the operator for manual assistance 141. If the answer is found 136, the caller is asked "WHAT PART OF THE CITY ARE YOU IN, NORTH, SOUTH, EAST, WEST OR DOWNTOWN?" 137 and the system sends the answer to ANSWER QUALITY ASSURANCE 138. If the answer was not north, south, east or west, the call is routed to the operator for manual assistance 141. If the answer was either north, south, east or west, the call is sent to DETERMINE STREET LOCATION 140. When either the operator has finished with the caller or the call has been sent to DETERMINE STREET LOCATION 140, the call returns 142 to regular processing.

Figure 16:
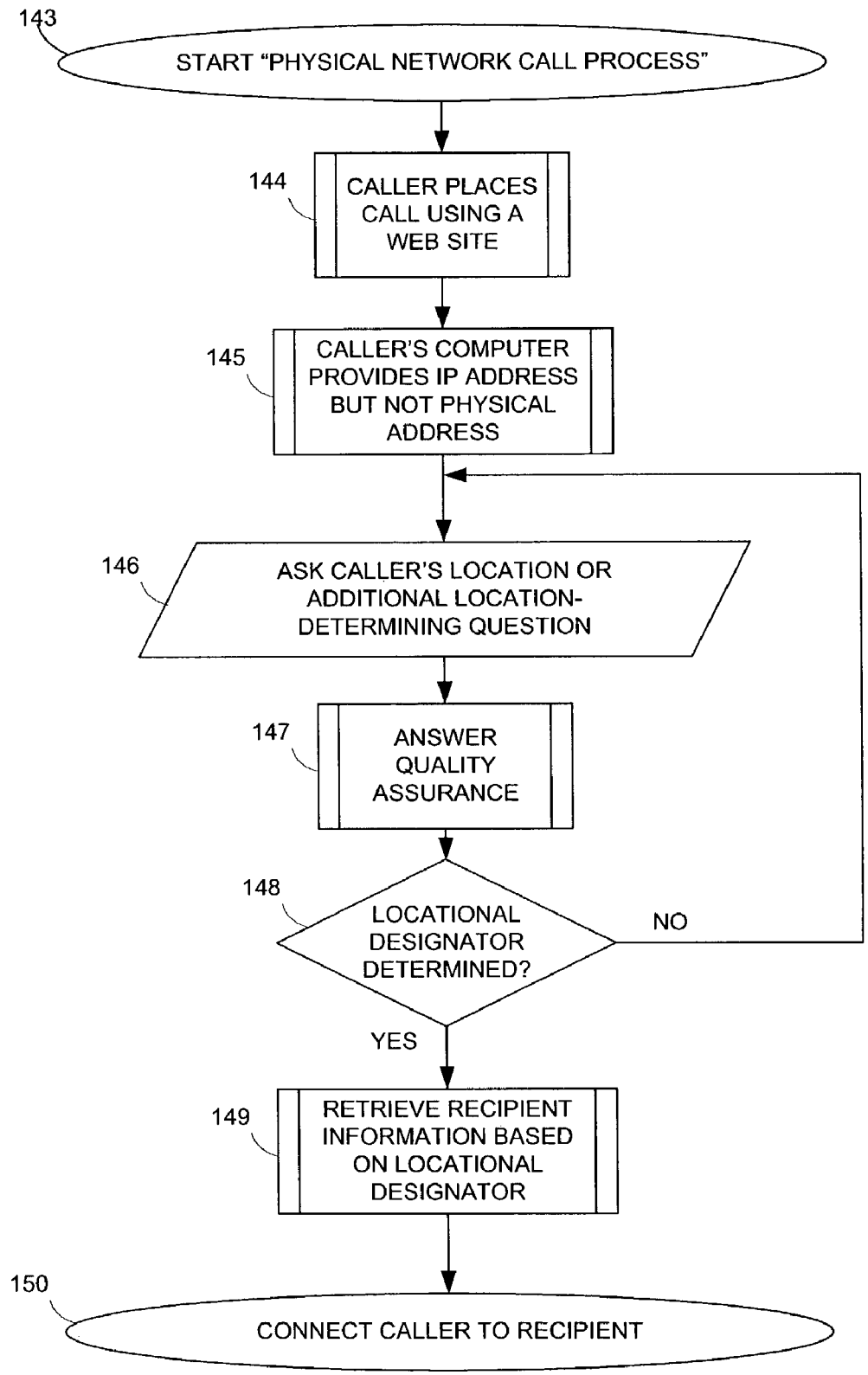
FIG. 16 is a flow diagram of an network embodiment.

FIG. 16 is a flow diagram of an network embodiment. The call enters the physical network call process module 143, with the caller responding to a "talk to a dealer now" or similar prompt on a web site 144. The web server captures the caller's IP address, but not a physical address 145. The system asks caller location-determining questions from a previously defined logic module 146. The call goes to answer quality assurance 147 for answer validation. The system checks to see if the locational designator has been determined 148. If the locational designator was not determined, the caller is asked additional questions 146 until the locational designator can be determined 148. The recipient information is retrieved 149 and the caller is connected to the recipient 150.

Figure 17:
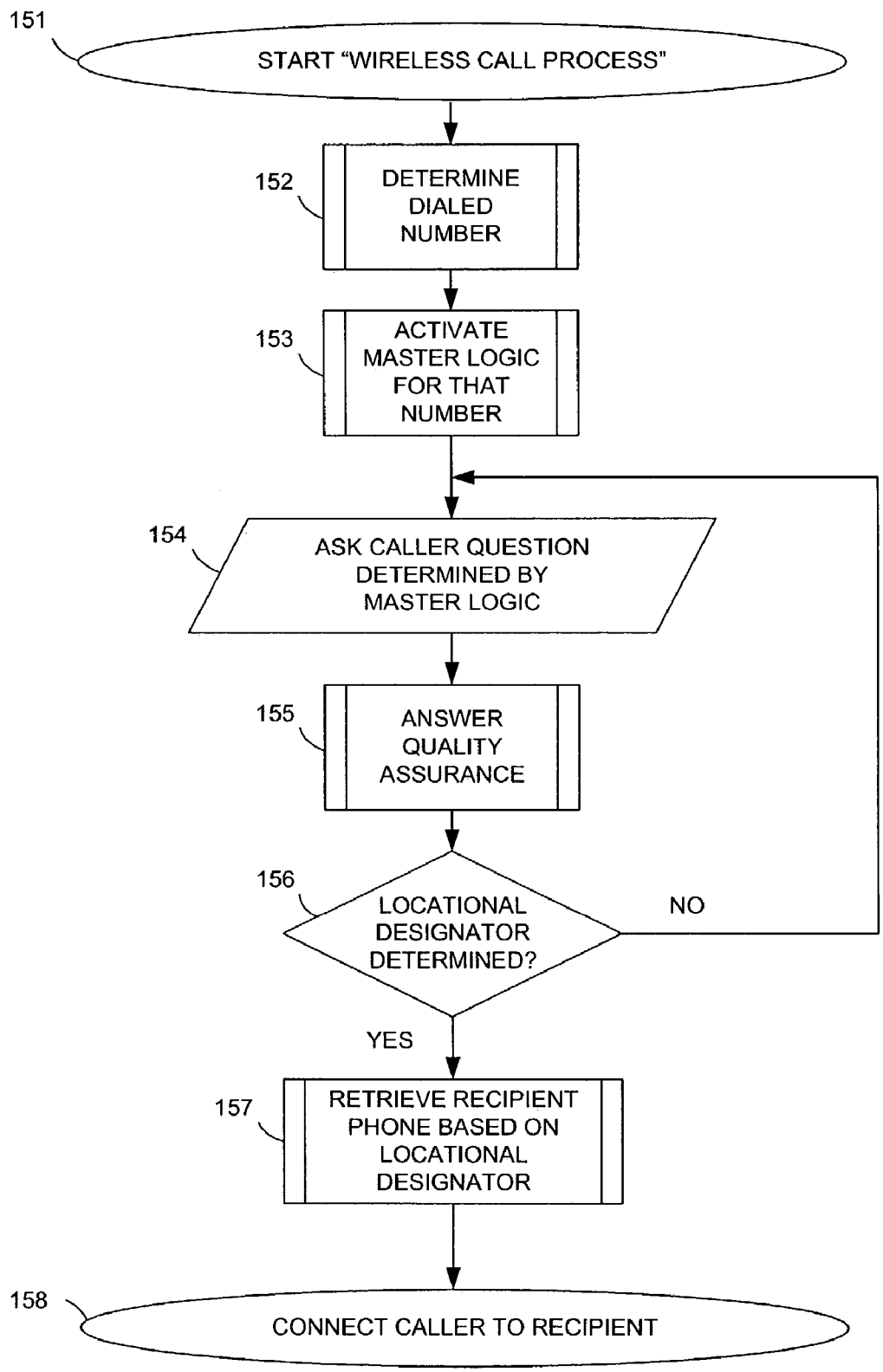
FIG. 17 is a flow diagram of an embodiment in a wireless network.

FIG. 17 is a flow diagram of an embodiment in a wireless network. The call enters the wireless call process module 151, where the first step is to determine the dialed number 152. Based on the dialed number, the system activates the master logic control for that system, which may be an address logic control, a zip code logic control, or other logic control as defined by client-defined criteria 153. The system asks caller location-determining questions from a previously defined logic module. 154. The call goes to answer quality assurance 155 for answer validation. The system checks to see if the locational designator has been determined 156. If the locational designator was not determined, the caller is asked additional questions 154 until the locational designator can be determined 156. The recipient information is retrieved 157 and the caller is connected to the recipient 158.

Figure 18:
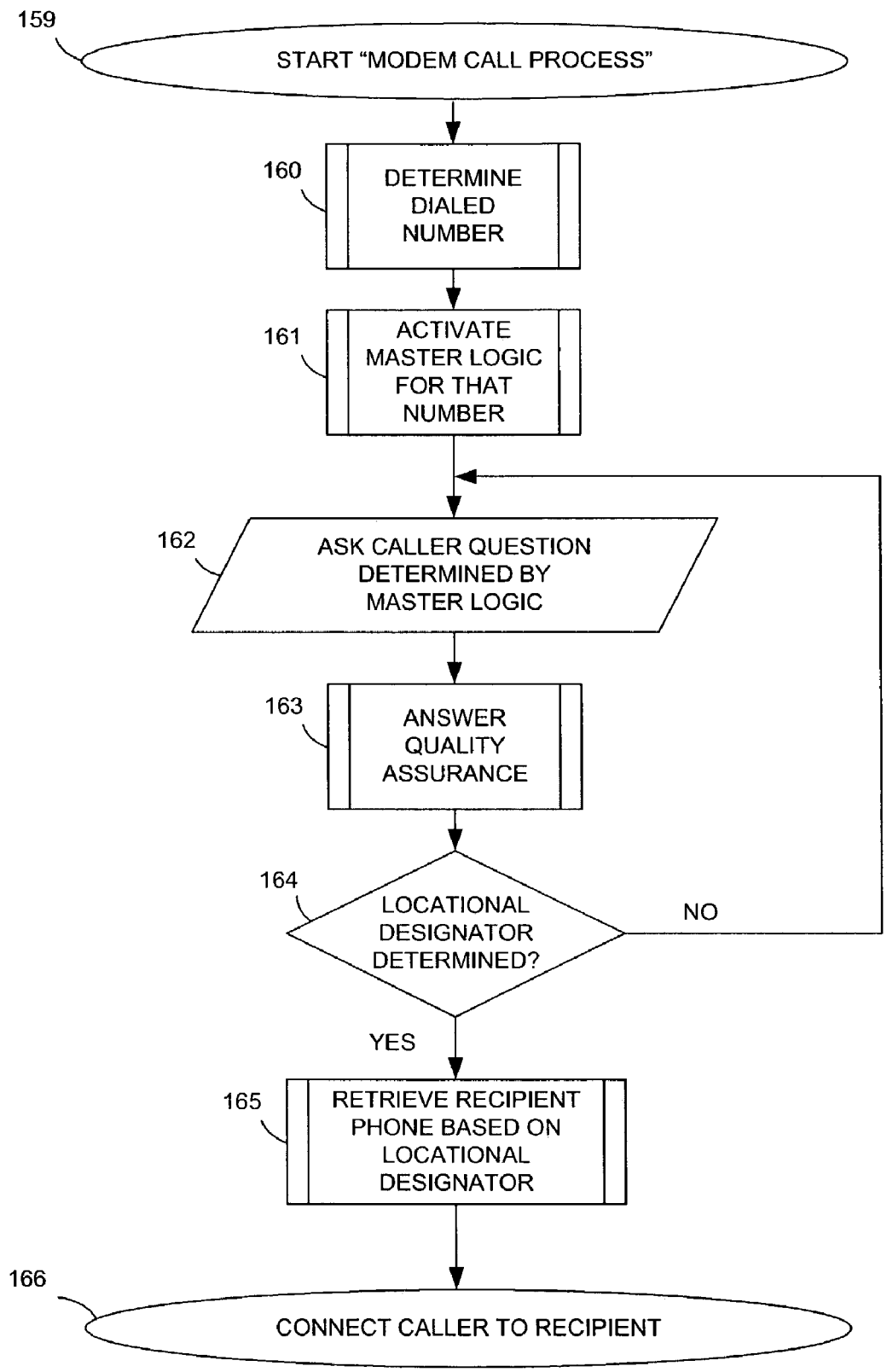
FIG. 18 is a flow diagram of an embodiment utilizing a modem.

FIG. 18 is a flow diagram of an embodiment utilizing a modem. The call enters the modem call process module 159, where the first step is to determine the dialed number 160. Based on the dialed number, the system activates the master logic control for that system, which may be an address logic control, a zip code logic control, or other logic control as defined by client-defined criteria 161. The system asks caller location-determining questions from a previously defined logic module 162 The call goes to answer quality assurance 163 for answer validation. The system checks to see if the locational designator has been determined 164. If the locational designator was not determined, the caller is asked additional questions 162 until the locational designator can be determined 164. The recipient information is retrieved 165 and the caller is connected to the recipient 166.

Figure 19:
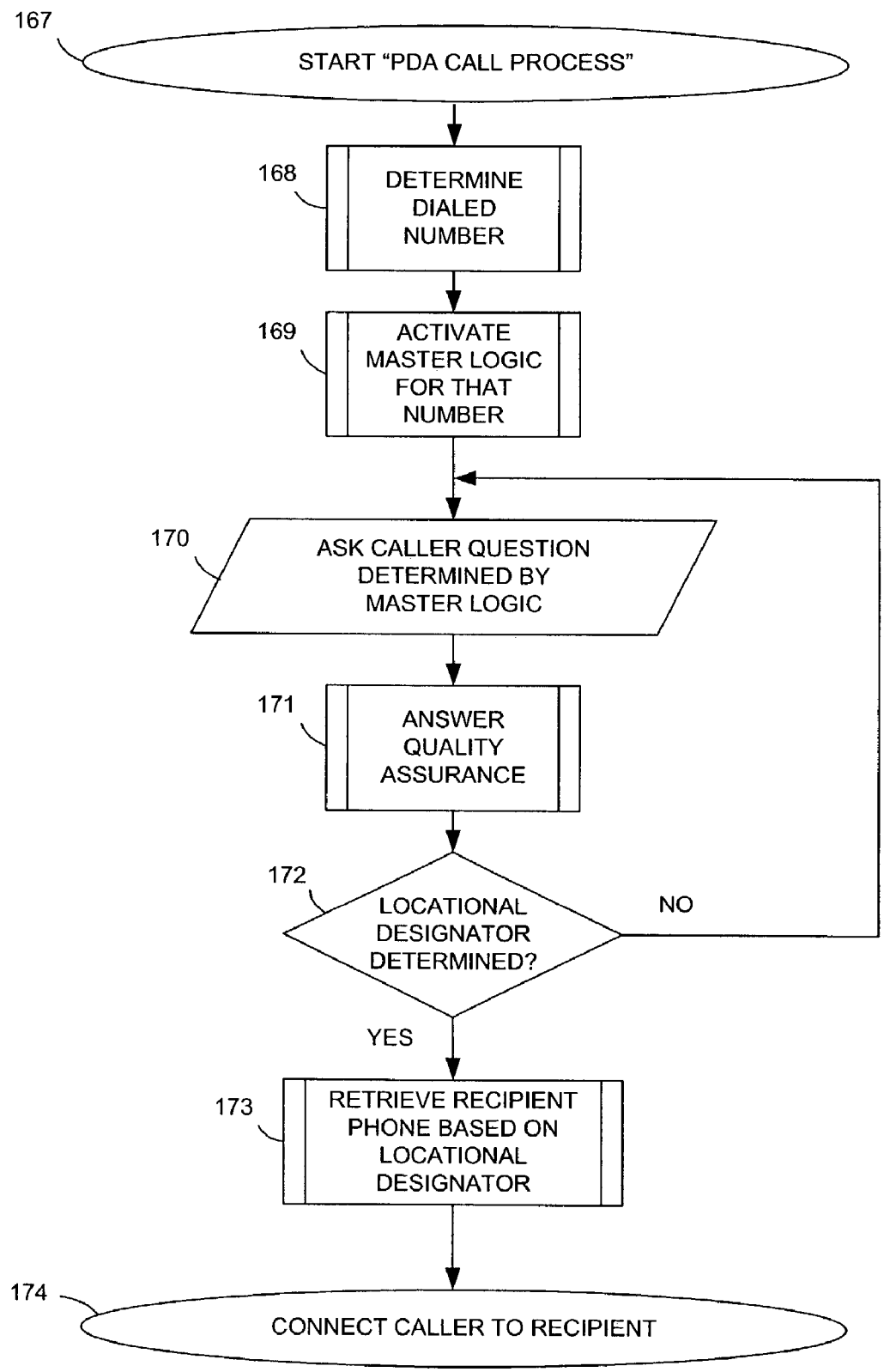
FIG. 19 is a flow diagram of an embodiment utilizing a portable wireless device.

FIG. 19 is a flow diagram of an embodiment utilizing a portable wireless device. The call enters the portable wireless device call process module 167, where the first step is to determine the dialed number 168. Based on the dialed number, the system activates the master logic control for that system, which may be an address logic control, a zip code logic control, or other logic control as defined by client-defined criteria 169. The system asks caller location-determining questions from a previously defined logic module 170. The call goes to answer quality assurance 171 for answer validation. The system checks to see if the locational designator has been determined 172. If the locational designator was not determined, the caller is asked additional questions 170 until the locational designator can be determined 172. The recipient information is retrieved 173 and the caller is connected to the recipient 174.

Figure 20:
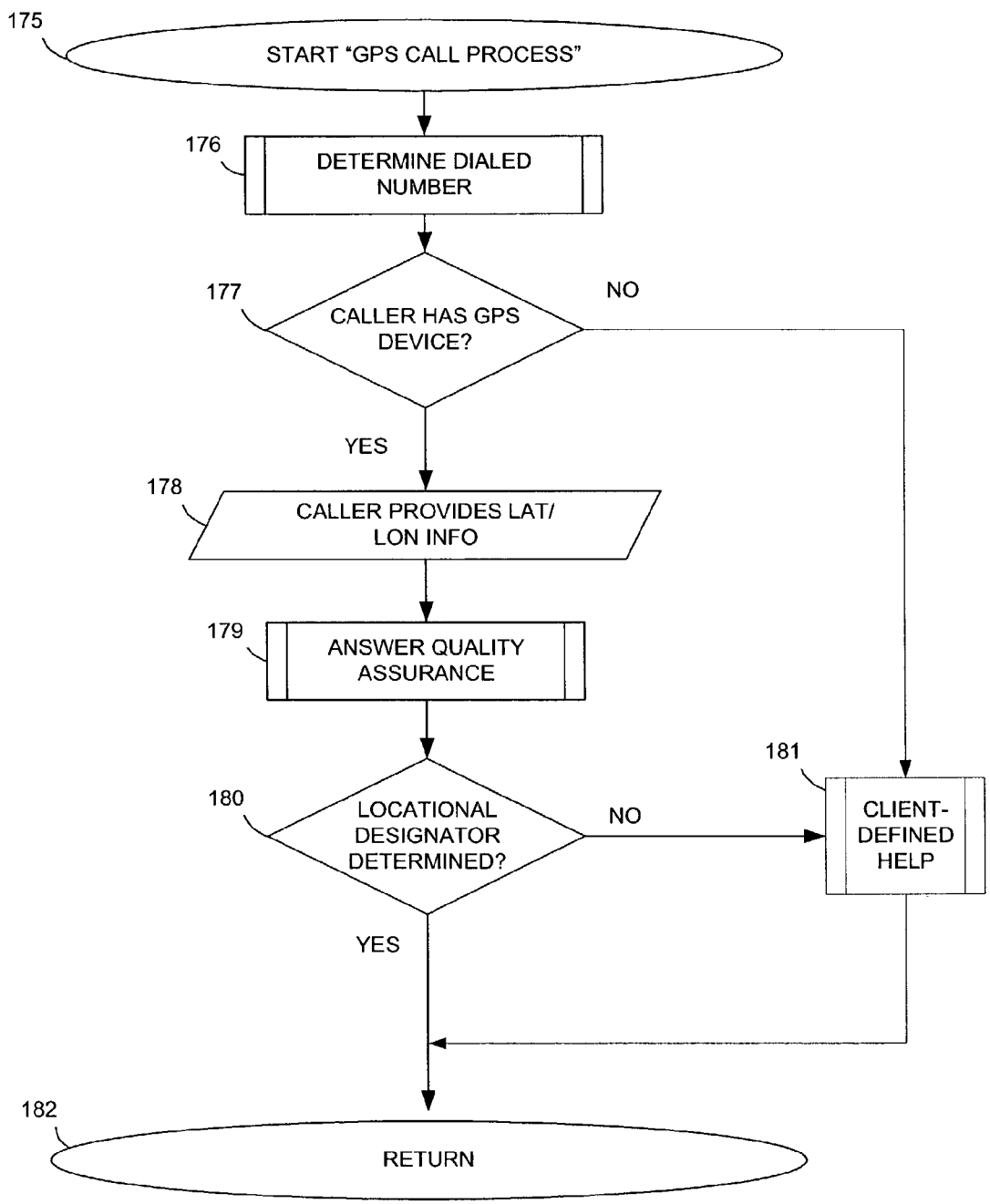
FIG. 20 is a flow diagram of an embodiment utilizing a GeoPositioning Satellite (GPS) device.

FIG. 20 is a flow diagram of an embodiment utilizing a GeoPositioning Satellite (GPS) device. The call enters the GPS call logic control 175 from FIG. 13, where the system first determines the dialed number 176. If the caller does not have a GPS device 177, he is sent to client-defined-help 181. If the caller does have a GPS device, the caller provides the latitude and longitude information 178. The call the goes to answer quality assurance 179. If the locational designator has not been determined, the call is sent to client-defined-help 181. If it has been determined, the call returns to FIG. 1 where the specific locational designator is applied against the client-defined criteria 7 to determine which of a plurality of client locations to route the call 8.

Figure 21:
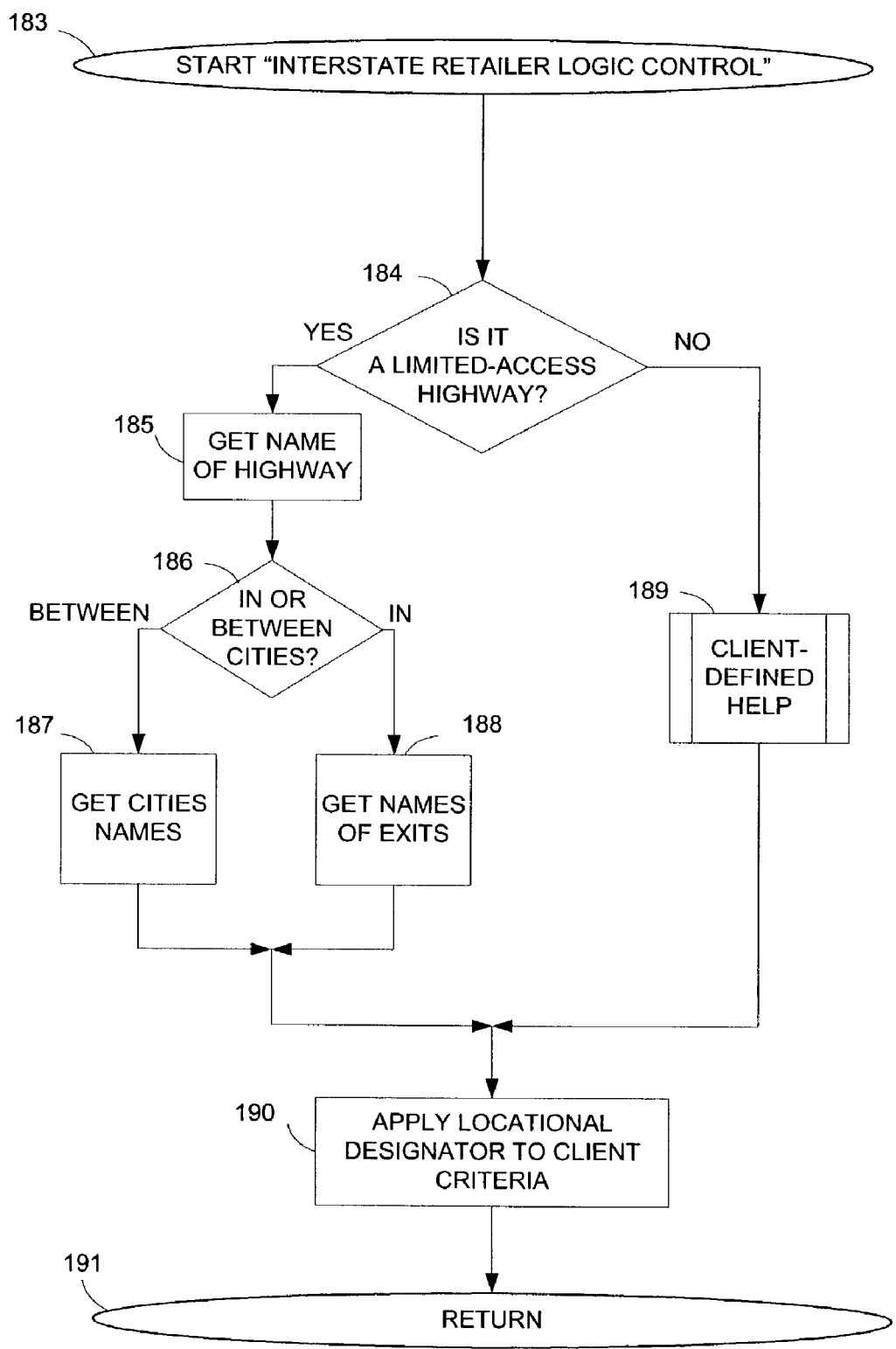
FIG. 21 is a flow diagram of an embodiment for a specialty retailer along a limited access highway.

FIG. 21 is a flow diagram of an embodiment in a specialty retailer application. The system enters the INTERSTATE RETAILER CONTROL 183 from FIG. 13. First, the caller is asked if he is on a LIMITED-ACCESS HIGHWAY 184. If the caller is not on a limited access highway, the call is sent to CLIENT-DEFINED HELP 189. If the caller is calling from a limited access highway, he is ASKED THE NAME OF THE HIGHWAY 185 and whether he is calling from BETWEEN TWO CITIES OR WITHIN A CITY 186. Based on the response to the question 186, the system DETERMINES WHICH CITIES THE CALLER IS BETWEEN 187 or the TWO EXITS HE IS BETWEEN 188. The locational designator is attached 190 and the call returns 191, where the specific locational designator is applied FIG. 1 against the client-defined criteria 7 to determine which of a plurality of client locations to route the call 8.

Thus, as described herein, this invention allows one to determine a telephone caller's location using a series of questions and matching answers to a database until a locational designator can be assigned to the location, for further routing to one of a plurality of locations based on that locational designator.

Although only a few embodiments of the present invention have been described in detail hereinabove, all improvements and modifications to this invention within the scope or equivalents of the claims are covered by this invention.

Having thus described our invention, we claim:

1. A method of call routing comprising:
   receiving a call from a caller to a system using a dialed number common for a plurality of potential recipients in different defined territories;
   determining whether an automatic number identification (ANI) for the caller exists that can be used to determine a locational designator of the caller including when the call originates from a non-stationary device including an electronic locational device;
   in cases wherein such an ANI does not exist that can be used to determine the locational designator of the caller including when the call originates from the non-stationary device, then using the system for
      determining whether the electronic locational device can be used to determine the locational designator of the caller,
      in cases wherein the electronic locational device cannot be used to determine the locational designator of the caller, then
         activating a logical script including questions to elicit at least one response from the caller,
         digitizing the at least one response from the caller using voice-recognition technology,
         continuing questions and responses until the locational designator of the caller has been determined,
         correlating the locational designator of the caller to a corresponding defined territory from among the different defined territories, and
         identifying a telephone number for a recipient from among the plurality of potential recipients based upon the corresponding defined territory.

2. The method according to claim 1 further comprising verifying accurate understanding of the at least one response.

3. The method according to claim 1 wherein the ANI is incomplete.

4. The method according to claim 1 wherein the non-stationary device comprises a non-stationary phone.

5. The method according to claim 1 wherein the ANI is absent.

6. The method according to claim 1 wherein the non-stationary device has a non-stationary classification indicating a wireless device.

7. The method according to claim 1 wherein the non-stationary device has a non-stationary classification indicating a modem.

8. The method according to claim 1 wherein the non-stationary device has a non-stationary classification indicating a call originating from a device other than a land-line phone.

9. The method according to claim 1 wherein the locational designator is determined in the background prior to operator intervention.

10. The method according to claim 1 wherein the electronic locational device is a GeoPositioning Satellite device.

11. The method according to claim 1 wherein the electronic locational device is a vehicular locational device.

12. The method according to claim 1 wherein determining whether an automatic number identification (ANI) for the caller exists that can be used to determine a locational designator of the caller further includes when the call originates from a device using voice over Internet Protocol (VoIP).

13. A system for call routing comprising:
   means for receiving a call from a caller using a dialed number common for a plurality of potential recipients in different defined territories; and
   means for determining whether an automatic number identification (ANI) for the caller exists that can be used to determine a locational designator of the caller including when the call originates from a non-stationary device including an electronic locational device, and in cases wherein such an ANI does not exist that can be used to determine the locational designator of the caller including when the call originates from the non-stationary device, then for
      determining whether the electronic locational device can be used to determine the locational designator of the caller,
      in cases wherein the electronic locational device cannot be used to determine the locational designator of the caller, then
         activating a logical script including questions to elicit at least one response from the caller,
         digitizing the at least one response from the caller using voice-recognition technology,
         continuing questions and responses until the locational designator of the caller has been determined,
         correlating the locational designator of the caller to a corresponding defined territory from among the different defined territories, and
         identifying a telephone number for a recipient from among the plurality of potential recipients based upon the corresponding defined territory.

14. The system according to claim 13 wherein said means for determining is also for verifying accurate understanding of the at least one response.

15. The system according to claim 13 wherein said means for determining is for determining whether the non-stationary device has a non-stationary classification indicating a wireless device.

16. The system according to claim 13 wherein said means for determining is for determining whether the non-stationary device has a non-stationary classification indicating a modem.

17. The system according to claim 13 wherein said means for determining is for determining whether the non-stationary device has a non-stationary classification indicating a call originating from a device other than a land-line phone.

18. The system according to claim 13 wherein said means for determining is also for determining whether a device being used by the caller comprises a voice over Internet Protocol (VoIP) device.

19. A system for call routing comprising:
   an input for receiving a call from a caller using a dialed number common for a plurality of potential recipients in different defined territories;
   a processor cooperating with said input for determining whether an automatic number identification (ANI) for the caller exists that can be used to determine a locational designator of the caller including when the call originates from a non-stationary source including an electronic locational device, and in cases wherein such an ANI does not exist that can be used to determine the locational designator of the caller including when the call originates from the non-stationary source, then for
      determining whether the electronic locational device can be used to determine the locational designator of the caller,
      in cases wherein the electronic locational device cannot be used to determine the locational designator of the caller, then
         activating a logical script including questions to elicit at least one response from the caller,
         digitizing the at least one response from the caller using voice-recognition technology,
         continuing questions and responses until the locational designator of the caller has been determined,
         correlating the locational designator of the caller to a corresponding defined territory from among the different defined territories, and
         identifying a telephone number for a recipient from among the plurality of potential recipients based upon the corresponding defined territory.

20. The system according to claim 19 wherein said processor is also for verifying accurate understanding of the at least one response.

21. The system according to claim 19 wherein said processor is for determining whether the non-stationary device has a non-stationary classification indicating a wireless device.

22. The system according to claim 19 wherein said processor is for determining whether the non-stationary device has a non-stationary classification indicating a modem.

23. The system according to claim 19 wherein said processor is for determining whether the non-stationary device has a non-stationary classification indicating a call originating from a device other than a land-line phone.

24. The system according to claim 19 wherein said processor is also for determining whether a device being used by the caller comprises a voice over Internet Protocol (VoIP) device.

* * * * *